(12) United States Patent
Chen et al.

(10) Patent No.: US 12,014,282 B2
(45) Date of Patent: Jun. 18, 2024

(54) DATA PROCESSING METHOD AND APPARATUS, ELECTRONIC DEVICE, AND STORAGE MEDIUM

(71) Applicant: TENCENT TECHNOLOGY (SHENZHEN) COMPANY LIMITED, Guangdong (CN)

(72) Inventors: Shimin Chen, Guangdong (CN); Songjie Niu, Guangdong (CN); Dongyan Zhou, Guangdong (CN); Donghai Yu, Guangdong (CN); Shijie Sun, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 426 days.

(21) Appl. No.: 17/338,404

(22) Filed: Jun. 3, 2021

(65) Prior Publication Data
US 2021/0295100 A1    Sep. 23, 2021

Related U.S. Application Data

(63) Continuation of application No. PCT/CN2020/079834, filed on Mar. 18, 2020.

(30) Foreign Application Priority Data

Apr. 8, 2019  (CN) .......................... 201910276851.1

(51) Int. Cl.
*G06K 9/00*     (2022.01)
*G06F 18/214*   (2023.01)
(Continued)

(52) U.S. Cl.
CPC ........... *G06N 5/022* (2013.01); *G06F 18/214* (2023.01); *G06F 18/2323* (2023.01);
(Continued)

(58) Field of Classification Search
CPC .................................................. G06F 18/2323
See application file for complete search history.

(56) References Cited

U.S. PATENT DOCUMENTS 6,266,804 B1 * 7/2001 Isman .................... G06F 11/323
                                                  714/E11.181
10,915,578 B1 * 2/2021 Hunter ................... G06N 3/084
(Continued)

FOREIGN PATENT DOCUMENTS

CN        106033332 A       10/2016
CN        106603336 A       4/2017
(Continued)

OTHER PUBLICATIONS

Kalavri, Vasiliki, Vladimir Vlassov, and Seif Haridi. "High-level programming abstractions for distributed graph processing." IEEE Transactions on Knowledge and Data Engineering 30.2 (2017): 305-324. (Year: 2017).*
(Continued)

*Primary Examiner* — Hadi Akhavannik
(74) *Attorney, Agent, or Firm* — ARENTFOX SCHIFF LLP

(57) ABSTRACT

Embodiments of this disclosure include a data processing method. In the method, a training sample set that includes a plurality of graph computing task training samples is obtained. At least one performance indicator feature of each of the graph computing task training samples is extracted. The at least one performance indicator feature includes one or more of a graph data feature, a graph processing platform feature, a graph algorithm feature, and a machine hardware feature. A target performance prediction model is generated based on a mapping relationship between actual execution times of the graph computing task training samples and the performance indicator features. According to at least one performance indicator feature of an inputted graph comput-
(Continued)

ing task test sample, a predicted execution time of the graph computing task test sample is output based on the target performance prediction model.

20 Claims, 11 Drawing Sheets

(51) Int. Cl.
*G06F 18/2323* (2023.01)
*G06F 18/2413* (2023.01)
*G06N 3/045* (2023.01)
*G06N 3/08* (2023.01)
*G06N 5/022* (2023.01)

(52) U.S. Cl.
CPC ....... *G06F 18/24147* (2023.01); *G06N 3/045* (2023.01); *G06N 3/08* (2013.01)

(56) References Cited

U.S. PATENT DOCUMENTS

| | | | | |
|---|---|---|---|---|
| 2014/0214798 A1* | 7/2014 | Nica | ................. | G06F 16/24542 707/718 |
| 2018/0024869 A1* | 1/2018 | John | ..................... | G06F 9/5066 718/105 |
| 2019/0005115 A1* | 1/2019 | Warrier | ................. | G16H 50/20 |
| 2019/0095756 A1 | 3/2019 | Agrawal et al. | | |
| 2019/0354840 A1* | 11/2019 | Riley | ..................... | G06N 3/045 |
| 2020/0057675 A1* | 2/2020 | Dias | ....................... | G06F 9/5061 |
| 2020/0074118 A1* | 3/2020 | Sutton | ................. | G06F 16/2379 |
| 2020/0257982 A1* | 8/2020 | Kim | ........................ | G06N 3/047 |
| 2021/0027197 A1* | 1/2021 | Foerster | ................ | G06F 9/5066 |

FOREIGN PATENT DOCUMENTS

| | | |
|---|---|---|
| CN | 109388565 A | 2/2019 |
| CN | 110070117 A | 7/2019 |
| EP | 3101599 A2 | 12/2016 |
| EP | 3 316 156 A1 | 5/2018 |

OTHER PUBLICATIONS

International Search Report mailed Jun. 30, 2020 issued in corresponding application PCT/CN2020/079834 (with English translation).

Written Opinion dated Jun. 30, 2020 issued in corresponding application PCT/CN2020/079834.

Supplementary European Search Report mailed May 11, 2022 in Application No. 20787245.8, 14 pages.

Amaris Gonzalez Marcos Tulio: "Performance prediction of application executed on GPUs using a simple analytical model and machine learning techniques", Jun. 25, 2018, pp. 1-109.

* cited by examiner

DATA PROCESSING METHOD AND APPARATUS, ELECTRONIC DEVICE, AND STORAGE MEDIUM

RELATED APPLICATIONS

This application is a continuation of International Application No. PCT/CN2020/079834, entitled "DATA PROCESSING METHOD AND APPARATUS, ELECTRONIC DEVICE AND STORAGE MEDIUM" and filed on Mar. 18, 2020, which claims priority to Chinese Patent Application No. 201910276851.1, entitled "DATA PROCESSING METHOD AND APPARATUS" and filed on Apr. 8, 2019. The entire disclosures of the prior applications are hereby incorporated by reference in their entirety.

FIELD OF THE TECHNOLOGY

This disclosure relates to the field of data processing technologies, including a data processing method and apparatus, an electronic device, and a storage medium.

BACKGROUND OF THE DISCLOSURE

Graphs are ubiquitous in actual applications. A graph can effectively express an association between data associated with vertices of the graph, such as an association between different accounts in a social media network, an association between commodities and customers in an e-commerce platform, and an association between web page information on the World Wide Web. However, a graph usually includes a large quantity of vertices and edges, and the vertices and edges are associated with a large amount of metadata, such as the gender, age, and geographic location of a user. Therefore, higher requirements are imposed on performance prediction for graph computing associated with numerous data.

In related art, when performance estimation is performed for a graph computing task, a graph structure and an execution environment corresponding to the graph computing task can be analyzed and performance estimation on the graph computing task can be implemented based on the result of the analysis. However, such an estimation of the performance of the graph computing task may not provide an accurate and comprehensive result, SUMMARY Embodiments of this disclosure include a data processing method and apparatus, an electronic device, and a non-transitory computer-readable storage medium, for example which can improve the accuracy of performance estimation for graph computing tasks, and also enrich types of performance estimation for the graph computing tasks.

An aspect of the embodiments of this disclosure provides a data processing method. In the method, a training sample set that includes a plurality of graph computing task training samples is obtained. At least one performance indicator feature of each of the graph computing task training samples is extracted. The at least one performance indicator feature includes one or more of a graph data feature, a graph processing platform feature, a graph algorithm feature, and a machine hardware feature. A target performance prediction model is generated based on a mapping relationship between actual execution times of the graph computing task training samples and the performance indicator features. According to at least one performance indicator feature of an inputted graph computing task test sample, a predicted execution time of the graph computing task test sample is output based on the target performance prediction model.

An aspect of the embodiments of this disclosure provides a data processing apparatus. The apparatus includes processing circuitry configured to obtain a training sample set that includes a plurality of graph computing task training samples, and extract at least one performance indicator feature of each of the graph computing task training samples. The at least one performance indicator feature includes one or more of a graph data feature, a graph processing platform feature, a graph algorithm feature, and a machine hardware feature. The processing circuitry is configured to generate a target performance prediction model based on a mapping relationship between actual execution times of the graph computing task training samples and the performance indicator features. The processing circuitry is further configured to output, according to at least one performance indicator feature of an inputted graph computing task test sample, a predicted execution time of the graph computing task test sample based on the target performance prediction model.

An aspect of this disclosure provides an electronic device, including a processor and a memory, the processor being connected to the memory, the memory being configured to store program code, and the processor being configured to invoke the program code, to perform the method according to the one aspect of the embodiments of this disclosure.

Another aspect of the embodiments of this disclosure provides a non-transitory computer-readable storage medium storing instructions, which when executed by a processor, cause the processor to perform the method according to the one aspect of the embodiments of this disclosure.

BRIEF DESCRIPTION OF THE DRAWINGS

To describe the technical solutions of the embodiments of this disclosure or the related art more clearly, the following briefly describes the accompanying drawings required for describing the embodiments or the related art. Apparently, the accompanying drawings in the following description show only some embodiments of this disclosure, and a person skilled in the art may still derive other drawings from these accompanying drawings without creative efforts.

DESCRIPTION OF EMBODIMENTS

The technical solutions in the embodiments of this disclosure are described below with reference to the accompanying drawings in the embodiments of this disclosure. Apparently, the described embodiments are merely some rather than all of the embodiments of this disclosure. All other embodiments obtained by a person of ordinary skill in the art based on the embodiments of this disclosure without creative efforts shall fall within the protection scope of this disclosure.

Figure 1:
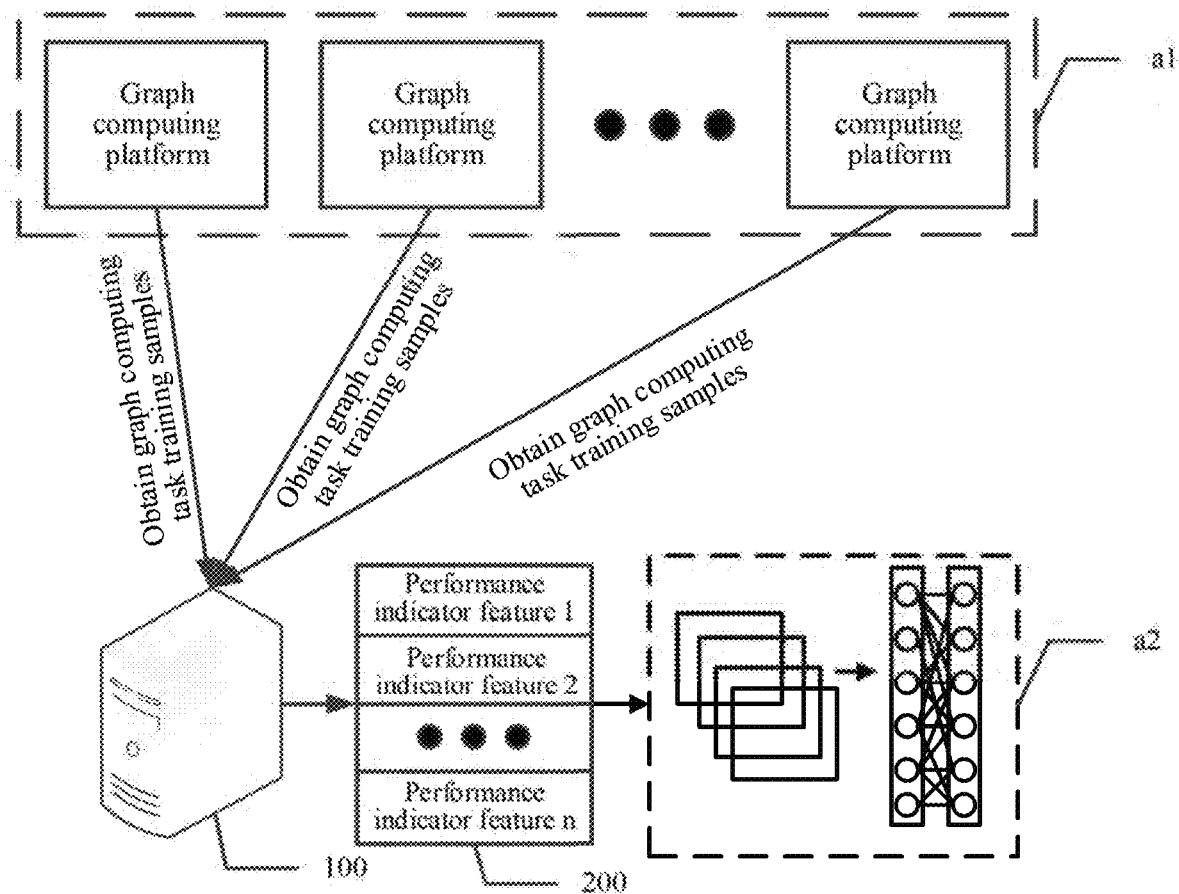
FIG. 1 is a schematic diagram of a scenario of model training according to an embodiment of this disclosure.

FIG. 1 is a schematic diagram of a scenario of model training according to an embodiment of this disclosure. In an actual application scenario, a data volume associated with a graph computing task can be extremely large, and graph data corresponding to the graph computing task can also be cumbersome. Consequently, it can be difficult to analyze the performance of the graph computing task. The execution efficiency of a complicated graph computing task is a concern in the field of graph computing. An embodiment of this disclosure provides a model that can predict an execution time of a graph computing task, which can be of great significance in analyzing the performance of graph computing in the field of the graph computing.

As shown in FIG. 1, a server 100 may obtain graph computing task training samples from a plurality of types of graph processing platforms in a graph processing platform set a1. Different graph processing platforms may have graph data structures, graph algorithms, and machine hardware that are different or partially the same, to enrich platform types of the graph computing task training samples. The obtained graph computing task training samples include different performance indicator features. A performance indicator feature can include at least one of the following: a graph data feature, a graph processing platform feature, a graph algorithm feature, and a machine hardware feature. The graph data feature is a performance indicator feature corresponding to a type of graph data, the graph processing platform feature is a performance indicator feature corresponding to a type of a graph processing platform, the graph algorithm feature is a performance indicator feature corresponding to a type of a graph algorithm, and the machine hardware feature is a performance indicator feature corresponding to a type of machine hardware.

Each graph computing task training sample further includes an actual execution time. The actual execution time refers to a time taken to complete performing of a graph computing task training sample in a graph processing platform (e.g., an actual time taken to complete one graph computing task). One graph computing task training sample may be understood as one graph computing task. The server 100 obtains the graph computing task training samples from a plurality of types of graph processing platforms in a1, and extracts a performance indicator feature corresponding to each obtained graph computing task training sample.

Any one, two, three, or four types of performance indicator features such as the graph data feature, the graph processing platform feature, the graph algorithm feature, and the machine hardware feature may be extracted, that is, any one, two, three, or four types of the performance indicator features may be respectively used as training data of a performance prediction model. More types of performance indicator features included in the training data indicates that a predicted execution time of a graph computing task that is predicted by the trained performance prediction model is more accurate.

The performance indicator features corresponding to all the graph computing task training samples are collectively referred to as a performance indicator feature set 200. The performance indicator feature set 200 includes n types of performance indicator features corresponding to n graph computing task training samples, a specific value of n being determined according to actual application scenarios. This is not limited herein.

An actual execution time and a performance indicator feature corresponding to each graph computing task training sample are used as inputs of an initial performance prediction model, to train the initial performance prediction model, until the initial performance prediction model converges. The trained initial performance prediction model is referred to as a target performance prediction model a2. The target performance prediction model may be used for computing a predicted execution time of a given graph computing task. For example, when a performance indicator feature of a graph computing task 1 is inputted to the target performance prediction model, that is, a graph data feature, a graph processing platform feature, a graph algorithm feature, and a machine hardware feature of the graph computing task 1 are all determined, the target performance prediction model may correspondingly output the predicted execution time of the graph computing task 1.

Further, an optimal execution environment of inputted graph data that is given may be determined based on the target performance prediction model. For example, for given graph data, a plurality of different graph processing platforms, graph algorithms, and machine hardware are configured for the graph data 1, to generate a plurality of graph computing tasks having the same graph data feature and different graph processing platform features, graph algorithm features, and machine hardware features. Performance indicator features corresponding to the plurality of graph computing tasks are respectively inputted to the target performance prediction model, to obtain a predicted execution time corresponding to each of the plurality of graph computing tasks, and a graph processing platform, a graph algorithm, and machine hardware corresponding to a graph computing task having a shortest predicted execution time are used as an optimal execution environment of the given graph data 1. For example, the optimal execution environment of the graph data 1 may be outputted based on the target performance prediction model according to the plurality of obtained predicted execution times.

In addition, when graph data is executed through different quantities of device clusters, effects are also different. A graph data feature, a graph processing platform feature, and a graph algorithm feature of graph data 2 may be alternatively fixed, and different quantities of devices of machine hardware are set, to obtain a plurality of graph computing tasks having different machine hardware features because of different quantities of devices and the same graph data feature, graph processing platform feature, and graph algorithm feature. Performance indicator features corresponding to the plurality of graph computing tasks are respectively inputted to the target performance prediction model, to obtain a predicted execution time corresponding to each of the plurality of graph computing tasks, and a quantity of devices corresponding to a graph computing task having a shortest predicted execution time is used as a quantity of device clusters through which an execution effect of the graph data 2 is the best.

Further, one, two, or three features in the graph data feature, the graph processing platform feature, the graph algorithm feature, and the machine hardware feature may be fixed, and predicted execution times of the graph computing tasks are computed by using the target performance prediction model, to determine optimal configuration of the other one, two, or three features that are not fixed.

In addition, in the method provided in this embodiment of this disclosure, performance indicator features of graph computing task training samples are fully extracted, so that a predicted execution time of a large-scale graph computing tasks may be predicted based on a small-scale training sample, which improves the model training efficiency and the accuracy of model prediction. Each graph computing task training sample corresponds to one target graph.

Figure 2:
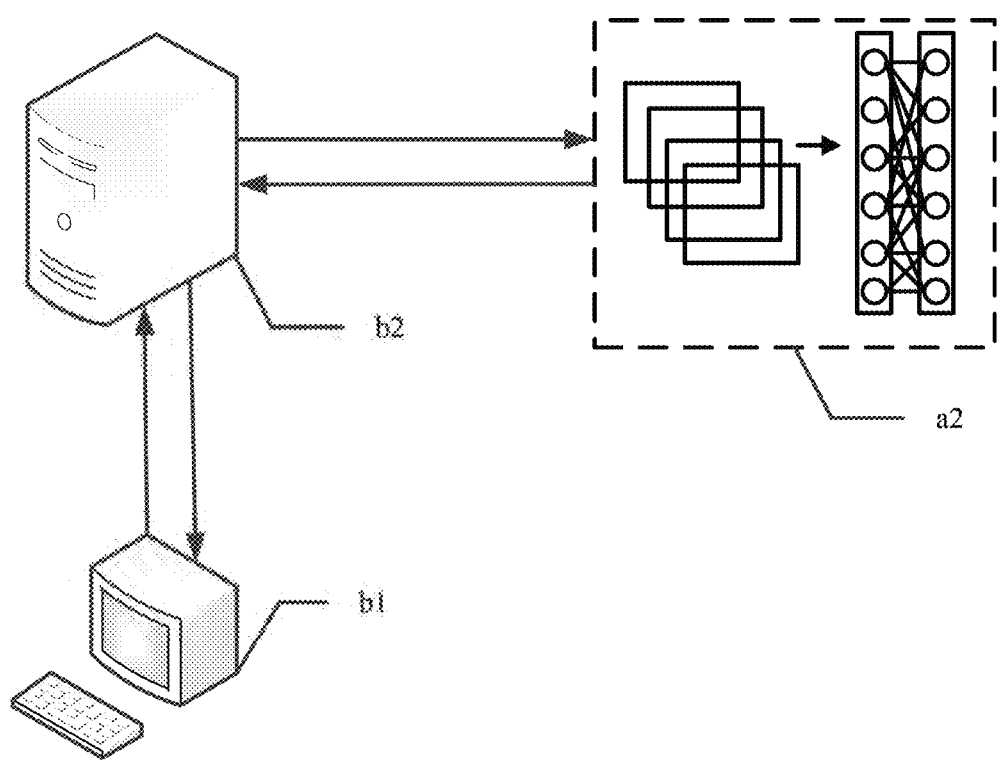
FIG. 2 is a schematic diagram of a scenario of model application according to an embodiment of this disclosure.

FIG. 2 is a schematic diagram of a scenario of model application according to an embodiment of this disclosure. As shown in FIG. 2, the server b2 is a server associated with a graph processing platform, a client b1 is a client associated with the graph processing platform, and a target performance prediction model a2 is a trained target performance prediction model. The client b1 may receive a graph computing task uploaded by a user, and transmit the received graph computing task to the server b2. The graph computing task includes a specific graph data feature, graph processing platform feature, graph algorithm feature, and machine hardware feature. The server b2 may compute, by using the associated target performance prediction model a2, a predicted execution time of the graph computing task uploaded by the user, and return a computation result to the server b2 after the computing is completed. The server b2 further transmits the computation result to the client b1 for presenting the computation result to the user. That is, prediction of an execution time of a graph computing task uploaded by a user is implemented based on the target performance prediction model a2, to allow the user to analyze correlated performance and configuration of the graph computing task according to the predicted execution time.

Figure 3:
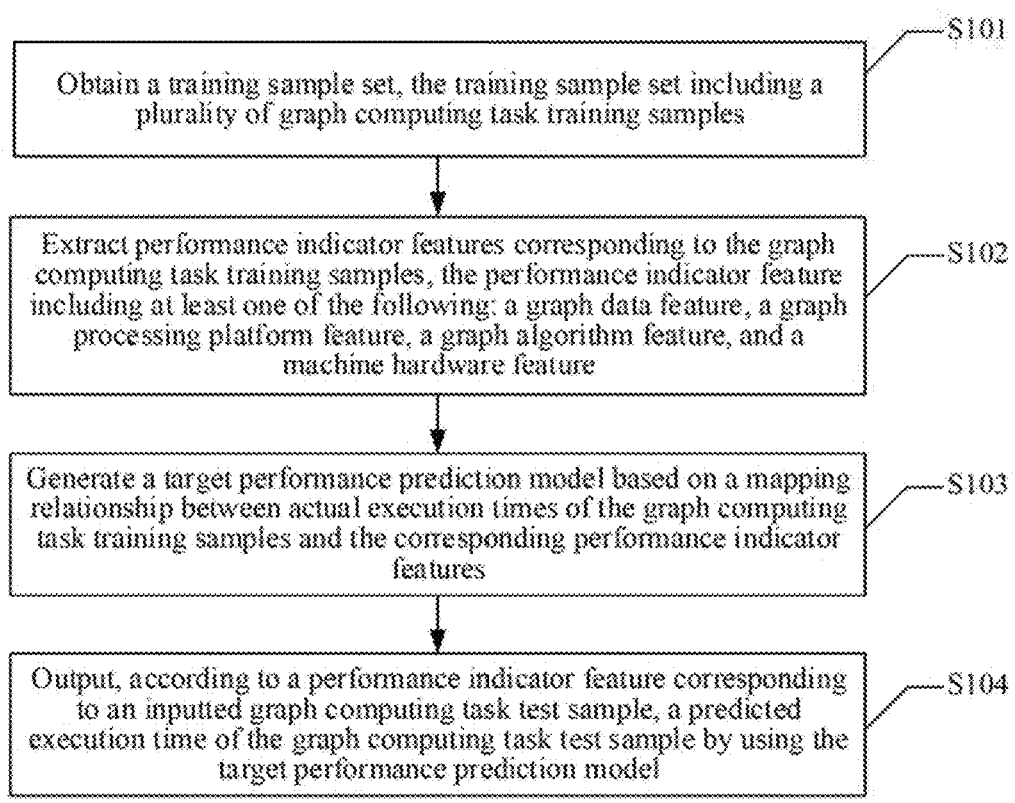
FIG. 3 is a schematic flowchart of a data processing method according to an embodiment of this disclosure.

FIG. 3 is a schematic flowchart of a data processing method according to an embodiment of this disclosure. The method is applicable to the server 100 shown in FIG. 1 or the server b2 shown in FIG. 2. As shown in FIG. 3, the method may include the following steps.

In Step S101, a training sample set is obtained. The training sample set includes a plurality of graph computing task training samples.

For example, the graph computing task training samples respectively correspond to different performance indicator features. The graph computing task training samples are obtained in a plurality of graph processing platforms of different types, and all the obtained graph computing task training samples are referred to as the training sample set. All the obtained graph computing task training samples have a plurality of types of performance indicator features such as a graph data feature, a graph processing platform feature, a graph algorithm feature, and a machine hardware feature, and at least one type of feature in a graph data feature, a graph processing platform feature, a graph algorithm feature, and a machine hardware feature of one graph computing task training sample is different from that of another different graph computing task training sample. The obtained graph computing task training samples correspond to a plurality of different graph data features, graph processing platform features, graph algorithm features, and machine hardware features. A more accurate and effective performance prediction model may be obtained by using the graph computing task training samples having rich feature types as a training sample set.

In step S102, performance indicator features corresponding to the graph computing task training samples are extracted. A performance indicator feature includes at least one of the following: a graph data feature, a graph processing platform feature, a graph algorithm feature, and a machine hardware feature.

For example, a performance indicator feature corresponding to each graph computing task training sample in the training sample set is extracted, the performance indicator feature including at least one of the four types of features: a graph data feature, a graph processing platform feature, a graph algorithm feature, and a machine hardware feature.

Any one feature in the graph data feature, the graph processing platform feature, the graph algorithm feature, and the machine hardware feature may be used as a performance indicator feature corresponding to a training sample. For example, the graph data feature is used as the performance indicator feature corresponding to the training sample, and the trained target performance prediction model computes, by recognizing a graph data feature of a graph computing task, a predicted execution time of the graph computing task. For example, the graph processing platform feature is used as the performance indicator feature corresponding to the training sample, and the trained target performance prediction model computes, by recognizing a graph processing platform feature of a graph computing task, a predicted execution time of the graph computing task. For example, the graph algorithm feature is used as the performance indicator feature corresponding to the training sample, and the trained target performance prediction model computes, by recognizing a graph algorithm feature of a graph computing task, a predicted execution time of the graph computing task. For example, the machine hardware feature is used as the performance indicator feature corresponding to the training sample, and the trained target performance prediction model computes, by recognizing a machine hardware feature of a graph computing task, a predicted execution time of the graph computing task.

Alternatively, any two features in the graph data feature, the graph processing platform feature, the graph algorithm feature, and the machine hardware feature may be used as performance indicator features corresponding to a training sample. For example, the graph data feature and the graph processing platform feature are used as the performance indicator features corresponding to the training sample, and the trained target performance prediction model computes, by recognizing a graph data feature and a graph processing platform feature of a graph computing task, a predicted execution time of the graph computing task. For example, the graph data feature and the graph algorithm feature are used as the performance indicator features corresponding to the training sample, and the trained target performance prediction model computes, by recognizing a graph data feature and a graph algorithm feature of a graph computing task, a predicted execution time of the graph computing task. For example, the graph data feature and the machine hardware feature are used as the performance indicator features corresponding to the training sample, and the trained target performance prediction model computes, by recognizing a graph data feature and a machine hardware feature of a graph computing task, a predicted execution time of the graph computing task. For example, the graph processing platform feature and the graph algorithm feature are used as the performance indicator features corresponding to the training sample, and the trained target performance prediction model computes, by recognizing a graph processing platform feature and a graph algorithm feature of a graph computing task, a predicted execution time of the graph computing task. For example, the graph processing platform feature and the machine hardware feature are used as the performance indicator features corresponding to the training sample, and the trained target performance prediction model computes, by recognizing a graph processing platform feature and a machine hardware feature of a graph computing task, a predicted execution time of the graph computing task. For example, the graph algorithm feature and the machine hardware feature are used as the performance indicator features corresponding to the training sample, and the trained target performance prediction model computes, by recognizing a graph algorithm feature and a machine hardware feature of a graph computing task, a predicted execution time of the graph computing task.

Alternatively, any three features in the graph data feature, the graph processing platform feature, the graph algorithm feature, and the machine hardware feature may be used as performance indicator features corresponding to a training sample. For example, the graph data feature, the graph processing platform feature, and the graph algorithm feature are used as the performance indicator features corresponding to the training sample, and the trained target performance prediction model computes, by recognizing a graph data feature, a graph processing platform feature, and a graph algorithm feature of a graph computing task, a predicted execution time of the graph computing task. For example, the graph data feature, the graph processing platform feature, and the machine hardware feature are used as the performance indicator features corresponding to the training sample, and the trained target performance prediction model computes, by recognizing a graph data feature, a graph processing platform feature, and a machine hardware feature of a graph computing task, a predicted execution time of the graph computing task. For example, the graph data feature, the graph algorithm feature, and the machine hardware feature are used as the performance indicator features corresponding to the training sample, and the trained target performance prediction model computes, by recognizing a graph data feature, a graph algorithm feature, and a machine hardware feature of a graph computing task, a predicted execution time of the graph computing task. For example, the graph processing platform feature, the graph algorithm feature, and the machine hardware feature are used as the performance indicator features corresponding to the training sample, and the trained target performance prediction model computes, by recognizing a graph processing platform feature, a graph algorithm feature, and a machine hardware feature of a graph computing task, a predicted execution time of the graph computing task.

Alternatively, all the four features, that is, the graph data feature, the graph processing platform feature, the graph algorithm feature, and the machine hardware feature, may be used as performance indicator features corresponding to a training sample, and the trained target performance prediction model computes, by recognizing a graph data feature, a graph processing platform feature, a graph algorithm feature, and a machine hardware feature of a graph computing task, a predicted execution time of the graph computing task.

More types of performance indicator features corresponding to the training sample indicates that the predicted execution time of the graph computing task that is predicted by the trained target performance prediction model is more accurate. For example, the accuracy of the predicted execution time of the graph computing task that is predicted by the trained target performance prediction model when there is one type of performance indicator feature is less than the accuracy of the predicted execution time of the graph computing task that is predicted by the trained target performance prediction model when there are two types of performance indicator features. The accuracy of the predicted execution time of the graph computing task that is predicted by the trained target performance prediction model when there are two types of performance indicator features is less than the accuracy of the predicted execution time of the graph computing task that is predicted by the trained target performance prediction model when there are three types of performance indicator features. The accuracy of the predicted execution time of the graph computing task that is predicted by the trained target performance prediction model when there are three types of performance indicator features is less than the accuracy of the predicted execution time of the graph computing task that is predicted by the trained target performance prediction model when there are four types of performance indicator features.

In step S103, a target performance prediction model is generated based on a mapping relationship between actual execution times of the graph computing task training samples and the corresponding performance indicator features.

For example, each graph computing task training sample includes an actual execution time. The actual execution time and the performance indicator feature of each graph computing task training sample are used as inputs of the initial performance prediction model, and the initial performance prediction model is trained by using a correspondence between the actual execution time and the performance indicator feature of each graph computing task training sample.

For example, the actual execution time and performance indicator feature of each inputted graph computing task training sample are converted into model parameters, that is, data recognizable by the model, based on the initial performance prediction model. The initial performance prediction model is trained based on model parameters of the actual execution times and model parameters of the performance indicator features, to obtain a model feature parameter of the initial performance prediction model, that is, a parameter of the initial performance prediction model. The model feature parameter is optimized and adjusted through repeated training, and the model parameters of the actual execution times and the model parameters of the performance indicator features that are converted by using the initial performance prediction model are optimized and adjusted based on the model feature parameter obtained after constant optimization, until the initial performance prediction model converges. Whether the initial performance prediction model is trained to be in a convergence state may be determined by using a loss function. That is, when a value of the loss function reaches a threshold range, it is determined that the initial performance prediction model is already trained to be in a convergence state. When the value of the loss function is not within the threshold range, training continues to be performed, and the model feature parameter of the initial performance prediction model is adjusted, until the value of the loss function reaches the threshold range through training.

Alternatively, whether the initial performance prediction model is trained to be in the convergence state may be determined by setting a threshold quantity of times of training, for example, setting the threshold quantity of times of training as 50. When a quantity of times of training of the initial performance prediction model by using the graph computing task training samples reaches 50, it is determined that the initial performance prediction model is already trained to be in the convergence state. The trained initial performance prediction model reaching the convergence state is referred to as the target performance prediction model.

In step S104, according to a performance indicator feature corresponding to an inputted graph computing task test sample, a predicted execution time of the graph computing task test sample is output by using the target performance prediction model.

In this step, the target performance prediction model is applied to a graph computing task test sample, to predict an execution time of the test sample.

It may be seen that in this embodiment of this disclosure, the target performance prediction model is trained based on execution times and performance indicator features corresponding to a large quantity of graph computing task training samples, so that the trained target performance prediction model can output corresponding predicted execution times based on performance indicator features corresponding to inputted graph computing tasks, and performance prediction is performed on the graph computing tasks specific to execution times of the graph computing tasks, enriching types of performance prediction for the graph computing task, and improving the accuracy of the performance prediction for the graph computing tasks.

Figure 4:
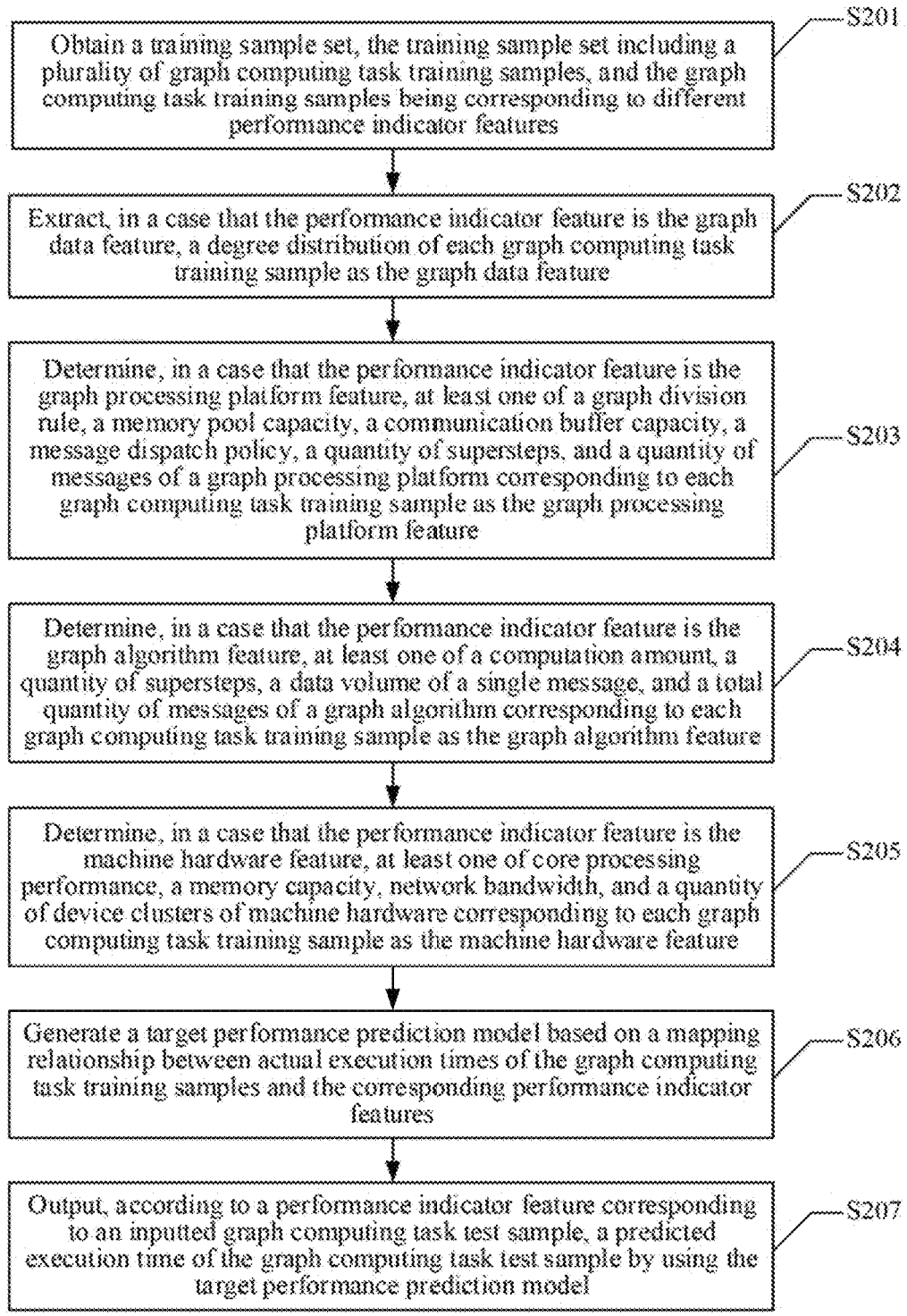
FIG. 4 is a schematic flowchart of another data processing method according to an embodiment of this disclosure.

FIG. 4 is a schematic flowchart of another data processing method according to an embodiment of this disclosure. The method is applicable to the server 100 shown in FIG. 1 or the server b2 shown in FIG. 2. As shown in FIG. 4, the method may include the following steps.

In step S201, a training sample set is obtained. The training sample set includes a plurality of graph computing task training samples, and the graph computing task training samples correspond to different performance indicator features.

For an exemplary implementation of step S201, reference may be made to the description of step S101 in the embodiment corresponding to FIG. 3, and details are not described herein again.

In step S202, when the performance indicator feature is the graph data feature, a degree distribution of each graph computing task training sample is extracted as the graph data feature.

In an embodiment, a degree of each vertex in graph data corresponding to each graph computing task training sample is extracted; and a degree distribution of the each graph computing task training sample is determined according to the degree interval of the each graph computing task training sample and the degree of each vertex.

For example, the degree interval is divided into a plurality of subintervals, a quantity of vertices included in each subinterval is determined according to a degree range of a subinterval to which the degree of each vertex in the graph data corresponding to the each graph computing task training sample belongs, and the degree distribution of the each graph computing task training sample is determined according to the quantity of vertices included in each subinterval. In this way, the degree distribution corresponding to the each graph computing task training sample is determined as the graph data feature of the each graph computing task training sample.

In another embodiment, a quantity of vertices and a quantity of edges of graph data of the each graph computing task training sample are extracted, and the quantity of vertices, the quantity of edges, and a degree distribution of the graph data corresponding to the each graph computing task training sample are determined as the graph data feature of the each graph computing task training sample.

In still another embodiment, when the performance indicator feature is the graph data feature, a quantity of vertices, a quantity of edges, a degree distribution, four parameters $(a_r, b_r, c_r, d_r)$ of a depict graph of R-MAT (a recursive matrix model for generating graphs), four parameters $(a_k, b_k, c_k, d_k)$ of a depict graph of Kronecker (a graph generation model), two parameters $(\mu, \sigma)$ of a depict graph of DGX (which depicts a degree distribution of a graph by using piecewise and discrete logarithmic normal distribution), and two parameters $(\alpha, \beta)$ of a depict graph of PowerLaw (power-law distribution) of graph data of each of the graph computing task training samples are extracted. The quantity of vertices and the quantity of edges of the graph data may be obtained by using basic data of the target graph.

The degree interval of the target graph is divided into a plurality of subintervals, exponential lengths or interval lengths of the subintervals being the same. For example, division of subintervals is performed according to an exponential length, a length of each subinterval being power of 2. Alternatively, division of subintervals is performed in an equal length manner, lengths of the subintervals being the same. The degree distribution is obtained according to a quantity of vertices included in each subinterval The parameters of R-MAT and DGX of the target graph may be obtained by using NetMine Package (a software package related to graph characteristics), the parameters of Kronecker are obtained by using kronfit (a tool for solving the parameters of Kronecker in Snap Package) of Snap Package (a general platform where a large-scale graph is analyzed and operated), and the parameters of PowerLaw are obtained by using the least square method. When the graph is of a relatively large scale, the parameters of Kronecker cannot be obtained by using kronfit, but may be obtained through estimation by using a mathematical relation between the parameters of R-MAT. A derivation formula thereof is as follows:

if a quantity of vertices of a target graph is represented as $|V|$, and a quantity of edges is represented as $|E|$, a probability that R-MAT generates one edge is:

$$P_r(e) = |E| * a_r^{|a_r|} * b_r^{|b_r|} * c_r^{|c_r|} * d_r^{|d_r|} \tag{1}$$

where $|a_r|+|b_r|+|c_r|+|d_r|=\log|V|$, and $a_r+b_r+c_r+d_r=1$; and a probability that Kronecker generates one edge is:

$$P_k(e) = a_k^{|a_k|} * b_k^{|b_k|} * c_k^{|c_k|} * d_k^{|d_k|} \tag{2}$$

where $|a_k|=|a_r|$, $|b_k|=|b_r|$, $|c_k|=|c_r|$, $|d_k|=|d_r|$, For the same edge, $P_r(e)=P_k(e)$, and therefore, the following may be obtained:

$$\left(\frac{a_k}{a_k}\right)^{|a_r|} * \left(\frac{b_k}{b_k}\right)^{|b_r|} * \left(\frac{c_k}{c_k}\right)^{|c_r|} * \left(\frac{d_k}{d_k}\right)^{|d_r|} = |E| \tag{3}$$

Assuming that $$\frac{a_k}{a_r} = \frac{b_k}{b_r} = \frac{c_k}{c_r} = \frac{d_k}{d_r} = \lambda, \lambda^{\log|V|} = |E|,$$

and assuming that $$|E| = r*|V|, \lambda = 2*r^{\frac{1}{\log|V|}},$$

that is, $$\frac{a_k}{a_r} = \frac{b_k}{b_r} = \frac{c_k}{c_r} = \frac{d_k}{d_r} = 2*r^{\frac{1}{\log|V|}},$$

where $$r = \frac{|E|}{|V|}.$$

The graph data feature further includes the following:

Mean clustering coefficient: A mean clustering coefficient of the entire target graph is an arithmetic mean of local clustering coefficients of all vertices in the target graph.

Quantity of open triangles: An open triangle is an open triplet in the figure, that is, three vertices are connected by two edges (a triangle lacking of one edge).

Quantity and proportion of closed triangles: A closed triangle is a closed triplet in the figure, that is, three vertices are connected to each other, to form a closed triangle, and the proportion herein refers to a proportion of closed triangles to a total quantity of open triangles and closed triangles.

Average degree: it is an arithmetic mean of degrees of all vertices in a target graph.

Quantity of vertices greater than an average degree and proportion of the vertices: A quantity of vertices greater than an average degree and a proportion of the quantity of vertices greater than the average degree to a total quantity of vertices.

Quantity of vertices two times greater than an average degree and proportion of the vertices: A quantity of vertices two times greater than an average degree and a proportion of the quantity of vertices two times greater than the average degree to a total quantity of vertices.

Quantity of vertices in a maximum connected component and a proportion of the vertices: A quantity of vertices in a maximum connected component and a proportion of the quantity of vertices in the maximum connected component to a total quantity of vertices.

Maximum feature value: it is a maximum feature value in a target graph.

Approximately full diameter: in a graph theory, a diameter of a graph refers to a maximum value of a shortest path between any two vertices, which is an approximately full diameter. 90% effective diameter: it is a length of a shortest path that 90% vertices in a target graph can be reached through the diameter.

The feature may be obtained by using PrintInfo (a tool for printing graph feature) and netstat (a tool for printing statistical information of a graph) of Snap Package.

In actual practice, to repeatedly evolve and update a target graph, performance indicator features in the target graph need to be periodically obtained, to obtain a more accurate performance prediction model according to updated graph data of the target graph.

In step S203, when the performance indicator feature is the graph processing platform feature, at least one of a graph division rule, a memory pool capacity, a communication buffer capacity, a message dispatch policy, a quantity of supersteps, and a quantity of messages of a graph processing platform corresponding to each graph computing task training sample is determined as the graph processing platform feature.

For example, an execution platform of the each graph computing task training sample may be GraphLite (a distributed graph processing platform). The GraphLite uses a Pregel (a graph processing system) architecture and performs Gather Apply Scatter (GAS)(a graph computing method) optimization on large-degree vertices. Gather refers to performing computation by gathering data of neighboring edges and vertices of a vertex in graph data of each computing node in each computing node, Apply refers to collectively transmitting data obtain in each node to a computing node, and Scatter refers to updating and transmitting a total quantity of neighboring nodes, of graph vertices, that are computed by the center computing node to each computing node.

When the performance indicator feature is the graph processing platform feature, at least one of a graph division rule, a memory pool capacity, a communication buffer capacity, a message dispatch policy, a quantity of supersteps, a quantity of messages, a threshold of GAS optimization, and a quantity of optimized messages of the graph processing platform GraphLite is extracted and used as the performance indicator feature.

The GraphLite performs Hash division on the graph data by default, and another division method, such as, metis (a graph division method), is also supported. In this case, a memory management mechanism is implemented inside GraphLite, a memory pool capacity also affects the computation performance to a certain degree, and a size of a buffer for each message target worker (process) and source worker (process) also affects network communication. GraphLite further optimizes, based on caches, a distribution process performed after messages are received in a worker (process), and different distribution strategies have different influences on the distribution performance. The Pregel architecture is based on a bulk synchronous parallel (BSP) computing model, and therefore, a quantity of supersteps in a synchronous process is an important factor. In addition, GraphLite is a model based on message transfer, and therefore, a quantity of messages is an importance factor affecting the communication performance.

After GAS optimization is performed on large-degree vertices, a total quantity of transmitted messages, a quantity of messages transmitted to the same worker (process), a quantity of messages transmitted to different workers in the same machine, a quantity of messages transmitted to a worker in different machines, a quantity of optimized messages transmitted by gather to the same worker, different workers in the same machine, and a worker in different machines, and a quantity of optimized messages transmitted by scatter to different workers in the same machine, and a worker in different machines in different gather/scatter thresholds may be obtained through statistics. All the foregoing features can reflect influences of different GAS settings on the optimization performance of graph computing, and the features may be set by viewing a graph processing platform and obtained through computation or estimation.

In step S204, when the performance indicator feature is the graph algorithm feature, at least one of a computation amount, a quantity of supersteps, a data volume of a single message, and a total quantity of messages of a graph algorithm corresponding to each graph computing task training sample is determined as the graph algorithm feature.

For example, when the performance indicator feature is the graph algorithm feature, a computation amount, a quantity of supersteps, a data volume of a single message, and a total quantity of messages of a graph algorithm corresponding to each graph computing task training sample are set as the performance indicator feature.

The computation amount refers to a part of each vertex for performing computation in compute (vertex computation function), which is determined according to a specific algorithm logic, and may be measured in a small scale by using a single machine.

A size of the data volume of a single message may be obtained from a user algorithm program. The quantity of supersteps is related to an algorithm logic and a graph structure. Both PageRank (PR) (a data mining algorithm) and community detection using label propagation (CDLP) algorithm have 30 designated supersteps, single-source shortest path (SSSP) algorithm, breadth-first search (BFS) algorithm, and weakly connected component (WCC) algorithm are related to a diameter of a graph, the foregoing approximately full diameter being used as an estimated value, and local clustering coefficient (LCC) algorithm is completed in two supersteps. Some inputted parameters of an algorithm also affect the computation performance, such as SSSP and BFS, and the computation performance varies greatly due to selection of different original vertices. Such a type of factor related to the graph structure may be depicted by completing the quantity of supersteps of the entire computing.

The total quantity of obtained messages is a total quantity of transmitted messages. In this embodiment of this disclosure, according to the graph algorithm corresponding to the each graph computing task training sample, the total quantity of messages is obtained through computation according to logic of the graph algorithm, or the total quantity of messages is obtained by solving a model built for a quantity of messages.

Specifically, according to different graph algorithms, a corresponding total quantity of messages may be obtained by using the following two cases.

The first case is to obtain the total quantity of messages through computation. For PageRank, a quantity of messages transmitted in each superstep is a quantity of edges of the target graph, and a total quantity of messages is a product of a quantity of supersteps and the quantity of edges; a quantity of messages transmitted by LCC is a quadratic sum of degrees of vertices; and a quantity of messages that are transmitted during execution processes of SSSP and BFS to end of the algorithms is about a quantity of edges of the target graph. The quantity of edges of the target graph is used as the estimated value.

The second case is to obtain the total quantity of messages by solving a model built for a quantity of messages. For CDLP and WCC, a quantity of transmitted messages is difficult to be obtained through computation or estimation in advance, but may be estimated by using a similar method for solving a performance model, and the specific method is as follows:

Considering that a quantity of messages is related to an algorithm logic and a graph structure, a series of thumbnails of the target graph may be generated by using TrillionG (a tool for generating graphs), and a quantity of messages are obtained through statistics by executing the CDLP and WCC algorithms on each thumbnail, to implement modeling for the quantity of messages. For example, 5 groups are set for four parameters a, b, c, and d. b=c=0.25, and d=s*a, where s=1, 2, 3, 4, 5, 100 groups of subgraphs with a quantity of vertices approximately increasing according to 50, 100, 150, 200, . . . , and 5000, and the quantity of vertices is about 10 times a quantity of edges. Therefore, 500 groups of graphs with a quantity of vertices and a quantity of edges that increase on a large scale and different skewness degrees may be obtained. Related features (e.g., a quantity of vertices, a quantity of edges, a degree distribution, and an approximate diameter) in graph data may be selected by using a total quantity of messages executed by CDLP and WCC in the 500 graphs, and training is performed on the total quantity of messages by using a neural network, and a model having high accuracy is stored to estimate the total quantity of messages.

The graph algorithm used by the each graph computing task training sample may be PageRank, and implementation on GraphLite uses PageRank in which a termination condition that the algorithm is stopped after 30 supersteps of iterations is used. During the 0th superstep, a value of each vertex is initialized to be 1, and messages having a value of a ratio of 1.0 to a quantity of out edges is transmitted along an out edge. In the subsequent first to 29th supersteps, assuming that messages received by each vertex in total is sum, a value of each vertex is set to be (0.15+0.85*sum), and messages having a value of a ratio of a value of vertex to a quantity of out edges are transmitted along an out edge. During the 30th superstep, similarly, assuming that messages received by each vertex in total is sum, a value of each vertex is set to be (0.15+0.85*sum). However, transmission of messages is stopped, and the vertex is in a non-active state. Because each vertex transmits the same message to all neighboring edges every time, the process may be optimized by using scatter; and because messages received by each vertex are added up, and the process may also be optimized by using gather. PR is basic implementation of PageRank, and values of vertices and messages are of a float type (single-precision floating point type).

In addition to the foregoing PR implementation, two types of variants may be further implemented.

The first type of variant is to test an influence of changing a computing cost of a single vertex on the system computation performance. In computation of the PR implementation, delay may be increased by using rdtsc (a central processing unit (CPU) instruction, capable of reading a time label), to manually control and increase the computation time.

The second type of variant is used for testing the influence of a quantity of messages on the system computation performance, which has the same logic as the PR implementation, and a difference lies in that values of vertices and messages in the second type of variant are changed to be of a double type (double-precision floating point type).

The graph algorithm used by the each graph computing task training sample may be SSSP, and implementation on GraphLite is as follows:

During the 0th superstep, values of all vertices are initialized to be INF (a constant greater than all possible distances between the original vertex and other vertices in the graph), only a value of the original vertex is updated (which is changed from INF to 0), and the original vertex then transmits a message to a neighboring vertex thereof.

In the subsequent supersteps, each vertex may first receive messages transmitted from neighboring vertices, and the message includes an updated potential shortest distance between the original vertex to the each vertex. If a minimum value in the updated values is less than a current value of the each vertex, the vertex updates the value thereof to be the minimum value, packs the value of the vertex and a value of each out edge as a message, and transmits the message to neighboring vertices thereof. Further, the neighboring vertices update values thereof, and then continue to transmit messages to neighboring vertices thereof. These processes are repeated.

When no update occurs again, the algorithm is ended. After that, values of all vertices are the shortest distances between the original vertex to the vertices. If a value is INF, it indicates that the vertex is unreachable. If weights of all edges are nonnegative, it may be ensured that the process is definitely ended. Because actually, only the minimum value of a receiving vertex is concerned, the algorithm may be optimized by using gather. The computation performance of the SSSP algorithm is related to the original vertex, and therefore, a series of original vertices may be sampled and used as the graph computing task training samples.

The graph algorithm used by the each graph computing task training sample may be BFP, and GraphLite provides two types of implementation, which are as follows.

The first type of implementation is referred to as BFS1, which is similar to SSSP, that is, BFS may be regarded as SSSP with weights of edges being 1, and may also be optimized by using gather.

The second type of implementation is referred to as BFS2, which uses a natural concept of superstep, and a depth of BFS search is a quantity of supersteps.

During the 0th superstep, a value of an original vertex is a quantity of supersteps, and the value of the vertex is then used as a message and transmitted to neighboring vertices of the vertex. Values of all other vertices are initialized to be INF (a constant greater than all possible distances between the original vertex and the other vertices in the graph), so that all the vertices are in a non-active state.

In the subsequent supersteps, vertices that receive messages are waken up. If a value of a vertex is still INF, the value is modified as a search depth, that is, a quantity of supersteps, and then the value of the vertex is used as a message and is transmitted to neighboring vertices of the vertex, so that the neighboring vertices are in the non-active state again. Because each vertex transmits the same message to all neighboring edges every time, the process may be optimized by using scatter. Messages are transmitted only to wake up vertices, each vertex does not use received message content, and therefore, the process may also be optimized by using gather. The computation performance of the BFS algorithm is related to the original vertex, and therefore, a series of original vertices may be sampled and used as the graph computing task training samples.

The graph algorithm used by the each graph computing task training sample may be WCC, and implementation on GraphLite is as follows.

During the 0th superstep, values of all vertices are initialized to be a vertex ID (identity information of the vertices), and then the values of all the vertices are used as messages and transmitted to neighboring vertices thereof, so that the vertices are in the non-active state again.

In the subsequent supersteps, if the minimum value of received messages is different from a value of a vertex, the value of the vertex is modified to be the minimum value, and the vertex transmits messages neighboring vertices thereof, so that the neighboring vertices are in the non-active state again. Because each vertex transmits the same message to all neighboring edges every time, the process may be optimized by using scatter; and because actually, only the minimum value of a receiving vertex is concerned, the algorithm may also be optimized by using gather.

The graph algorithm used by the each graph computing task training sample may be CDLP, and implementation on GraphLite is similar to that on CDLP and PageRank, that is, the algorithm is stopped after 30 supersteps of iterations. During the 0th superstep, a value of each vertex is initialized to be an ID of the each vertex, and the value of the vertex is then transmitted as a message along an out edge. In the subsequent first to 29th supersteps, each vertex obtains a probability of vertex IDs in received messages through statistics, selects a maximum value in the receives vertex IDs as a value thereof, and then transmits the value of the vertex as a message along an out edge. During the 30th supersteps, similarly, each vertex obtains a probability of vertex IDs in received messages through statistics, selects a maximum value in the receives vertex IDs as a value thereof, and stops transmitting a message, so that each vertex is in a non-active state. A final ID value of each vertex is a label, and vertices with the same label are classified into the same community.

The graph algorithm used by the each graph computing task training sample may be LCC, and implementation on GraphLite are divided into 3 supersteps. During the first two supersteps, a quantity of connected closed triangles of each vertex is computed, that is, in the 0th superstep, each vertex transmits IDs of neighboring vertices thereof to all the neighboring vertices, and in the first superstep, after receiving messages, each vertex views whether received message vertex IDs are included in a list of neighboring vertices thereof. If it is determined that the received message vertex IDs are included, it indicates that one connected closed triangle can be formed. In the third superstep, each vertex computes a local clustering coefficient.

In step S205, when the performance indicator feature is the machine hardware feature, at least one of core processing performance, a memory capacity, network bandwidth, and a quantity of device clusters of machine hardware corresponding to each graph computing task training sample is determined as the machine hardware feature.

For example, when the performance indicator feature is the machine hardware feature, features in four aspects of a CPU, a memory, a network, and a cluster of machine hardware corresponding to the each graph computing task training sample are used as the performance indicator feature.

The CPU of the machine hardware refers to a dominant frequency, a quantity of thread, whether core binding executes, and a cache capacity. The dominant frequency directly affects the computation performance, the core binding may improve a hit ratio of cache, and the quantity of thread affects a quantity of workers that can be efficiently executed on a node. For computation of a memory graph, cache has a great influence on access of the graph, intermediate computation values, and messages.

The memory refers to a memory capacity of machine hardware and whether non-uniform memory access architecture (NUMA) is enabled. The memory capacity directly affects the scale of graph computing, including inputted graph of a resident memory, remaining of intermediate computation states, and messages transmitted in the process. It is found through experiment that the NUMA structure also has a great influence on computation. Costs of computation and message transfer on the same node are relatively small, so that the performance of graph computing can be greatly improved by properly using the structure.

The network refers to network bandwidth of the machine hardware. Due to a message transfer mechanism of the graph computing, data usually needs to be transmitted or received between different workers. Messages in a cluster that is not between workers of the same nodes are transmitted through the network. A size of bandwidth greatly affects the performance of the entire graph computing, and network communication becomes the bottleneck of the graph computing under when the bandwidth is not high.

The cluster refers to a quantity of machines of the machine hardware and a quantity of workers on each machine. When a quantity of machine nodes is relatively few, the bottleneck of the graph computing is the processing capability of a single node. As machine nodes increase, the communication overheads of the graph computing may become the bottleneck of the performance. In this case, the increasing of the quantity of machine nodes cannot further improve the performance, and may have an opposite effect.

In step S206, a target performance prediction model is generated based on a mapping relationship between actual execution times of the graph computing task training samples and the corresponding performance indicator features.

For an exemplary implementation process of step S206, reference may be made to the description of step S103 in the embodiment corresponding to FIG. 3, and details are not described herein again.

In step S207, according to a performance indicator feature corresponding to an inputted graph computing task test sample, a predicted execution time of the graph computing task test sample is output by using the target performance prediction model.

For an exemplary implementation process of step S207, reference may be made to the description of step S104 in the embodiment corresponding to FIG. 3, and details are not described herein again.

It may be seen that in this embodiment of this disclosure, the target performance prediction model is trained based on execution times and performance indicator features corresponding to a large quantity of graph computing task training samples, so that the trained target performance prediction model can output corresponding predicted execution times based on performance indicator features corresponding to inputted graph computing tasks, and performance prediction is performed on the graph computing tasks specific to execution times of the graph computing tasks, enriching types of performance prediction for the graph computing task, and improving the accuracy of the performance prediction for the graph computing tasks.

Figure 5A:
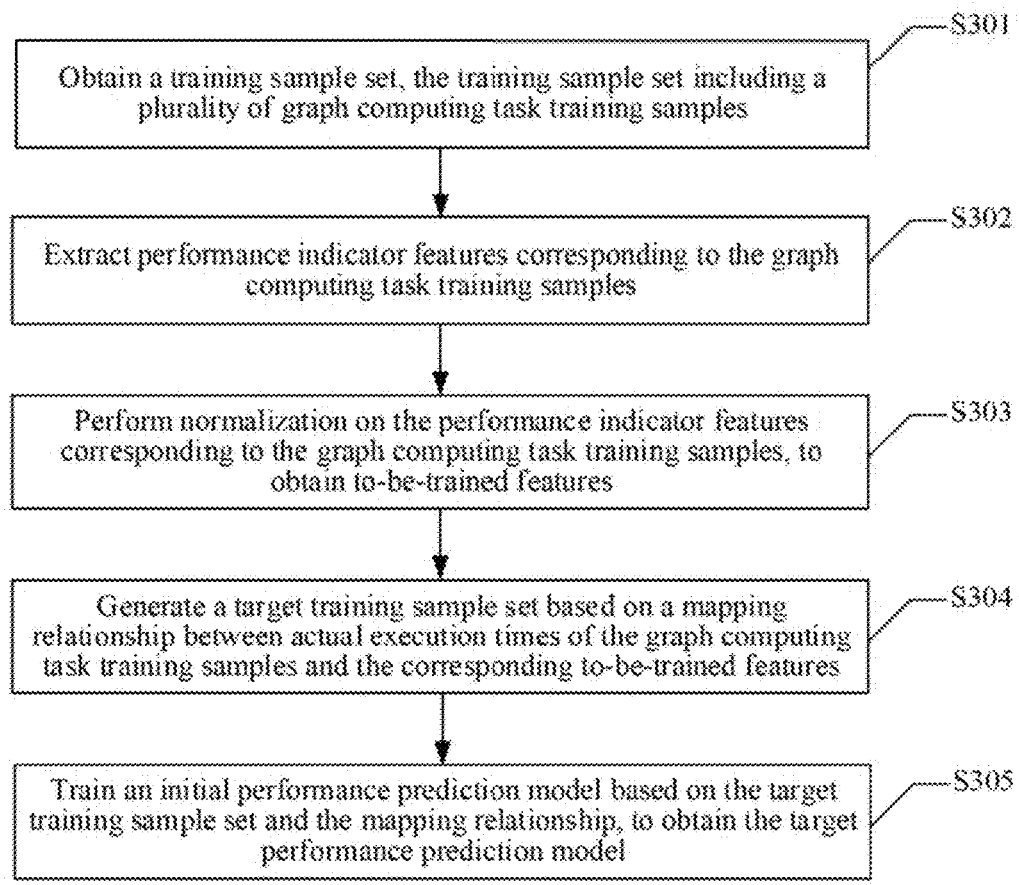
FIG. 5a is a schematic flowchart of another data processing method according to an embodiment of this disclosure.

FIG. 5a is a schematic flowchart of another data processing method according to an embodiment of this disclosure. The method is applicable to the server 100 shown in FIG. 1 or the server b2 shown in FIG. 2. As shown in FIG. 5a, the method may include the following steps.

In step S301, a training sample set is obtained. The training sample set includes a plurality of graph computing task training samples, and the graph computing task training samples correspond to different performance indicator features.

In step S302, performance indicator features corresponding to the graph computing task training samples are extracted.

For an exemplary implementation process of step S301 to step S302, reference may be made to the description of step S101 to step S102 in the embodiment corresponding to FIG. 3, and details are not described herein again.

In step S303, normalization is performed on the performance indicator features corresponding to the graph computing task training samples, to obtain to-be-trained features.

For example, because value ranges of the extracted performance indicator features of the graph computing task training samples differ greatly, normalization may be performed on all the obtained performance indicator features corresponding to the graph computing task training samples. Normalization may be performed by using z-score (a standardized variable)herein.

Z-score is also referred to as a standard score, which is a process of dividing a value obtained by subtracting an average from a number by a standard deviation. In statistics, the standard score is a symbolic number of standard deviations by which a value of an observed data point is above the mean value of an observed value or measured value.

A normalized performance indicator feature corresponding to each graph computing task training sample is respectively referred to as a to-be-trained feature of the each graph computing task training sample. Each to-be-trained feature includes the performance indicator feature such as the graph data feature, the graph processing platform feature, the graph algorithm feature, and the machine hardware feature of each graph computing task training sample. Each graph computing task training sample has different performance indicator features.

In step S304, a target training sample set is generated based on a mapping relationship between actual execution times of the graph computing task training samples and the corresponding to-be-trained features.

For example, each graph computing task training sample has a to-be-trained feature corresponding to thereof, and a target training sample set is generated according to a mapping relationship between actual execution times of the graph computing task training samples and the corresponding to-be-trained features. A mapping relationship between an actual execution time of a graph computing task training sample and a corresponding to-be-trained feature correspondingly generates a training sample. The target training sample set includes training data associated with the mapping relationship between actual execution times of the graph computing task training samples and the corresponding to-be-trained features.

In step S305, an initial performance prediction model is determined based on the target training sample set and the mapping relationship, to obtain the target performance prediction model.

In this step, an initial performance prediction model is trained, and after the training achieves convergence, the target performance prediction model is obtained. For example, with reference to FIG. 5b, the following steps are included.

In step S3051, the target training sample set is input to an input layer of the initial performance prediction model, and predicted training times of the graph computing task training samples are obtained at an output layer of the initial performance prediction model.

For example, the obtained target training sample set is inputted to an input layer of the initial performance prediction model, data included in the inputted target training sample set is converted, based on a model feature parameter of the initial performance prediction model, into model parameters recognizable by the initial performance prediction model, and a predicted training time of each graph computing task training sample is obtained according to model parameters of an actual execution time and a performance indicator feature corresponding to the each graph computing task training sample.

The initial training model may be a linear model. A series of machine learning and deep learning models, such as the initial training model, may be KNN (a model of an IBk trainer based on K nearest neighbor), Decision Tree (a model of M5P (a classifier) based on a decision tree), Decision Tree (a model of REPTree (a classifier) based on a decision tree), GBDT (a model of a bagging trainer and an additive regression trainer based on a gradient boosting tree), SVM (a model of a random forest algorithm trainer and an SMOreg (an algorithm) trainer based on a support vector machine), a multilayer perceptron (MLP) model, a convolutional neural network (CNN), a recurrent neural network (RNN), and a long short term memory (LSTM) network.

Because the constructed CNN model requires that a quantity of features is power of 2, and the constructed RNN model and LSTM model require that a quantity of features is a multiple of 2, some important features, such as a quantity of messages and a diameter of a graph, are repeated in inputted data, that is, performance indicator features, of the CNN model, the RNN model, and the LSTM model.

The linear and machine learning models may be trained by invoking a waikato environment for knowledge analysis (weka), and the deep learning model is trained by invoking Tensorflow (a symbolic math system programmed based on data flow).

In step S3052, a model parameter of the initial performance prediction model is corrected based on the actual execution times and the predicted training times of the graph computing task training samples.

For example, the initial performance prediction model corrects and adjusts a model parameter, that is, a model feature parameter, of the initial performance prediction model according to differences, that is, time differences, between the obtained predicted training times and actual execution times of the graph computing task training samples. The model feature parameter of the initial performance prediction model is repeatedly corrected during training of the model, thereby gradually improving the accuracy of an execution time of a graph computing task predicted by the initial performance prediction model.

In step S3053, the target performance prediction model is obtained based on the initial performance prediction model, the corrected model parameter, and the mapping relationship between the actual execution times of the graph computing task training samples and the corresponding to-be-trained features.

For example, the initial performance prediction model is trained by using the mapping relationship between the actual execution times of the graph computing task training samples and the corresponding to-be-trained features. During training, the model feature parameter of the initial performance prediction model is repeatedly corrected until the initial performance prediction model converges. In this case, the training of the initial performance prediction model is completed, and the trained initial performance prediction model is referred to as the target performance prediction model.

In this embodiment of this disclosure, a training sample set is obtained, the training sample set including a plurality of graph computing task training samples; performance indicator features corresponding to the graph computing task training samples are extracted; and a target performance prediction model is generated based on a mapping relationship between actual execution times of the graph computing task training samples and the corresponding performance indicator features, the target performance prediction model is used for outputting predicted execution times according to performance indicator features corresponding to inputted graph computing task test samples. It may be seen that in this embodiment of this disclosure, the target performance prediction model is trained based on execution times and performance indicator features corresponding to a large quantity of graph computing task training samples, so that the trained target performance prediction model can output corresponding predicted execution times based on performance indicator features corresponding to inputted graph computing tasks, and performance prediction is performed on the graph computing tasks specific to execution times of the graph computing tasks, enriching types of performance prediction for the graph computing task, and improving the accuracy of the performance prediction for the graph computing tasks.

Figure 6:
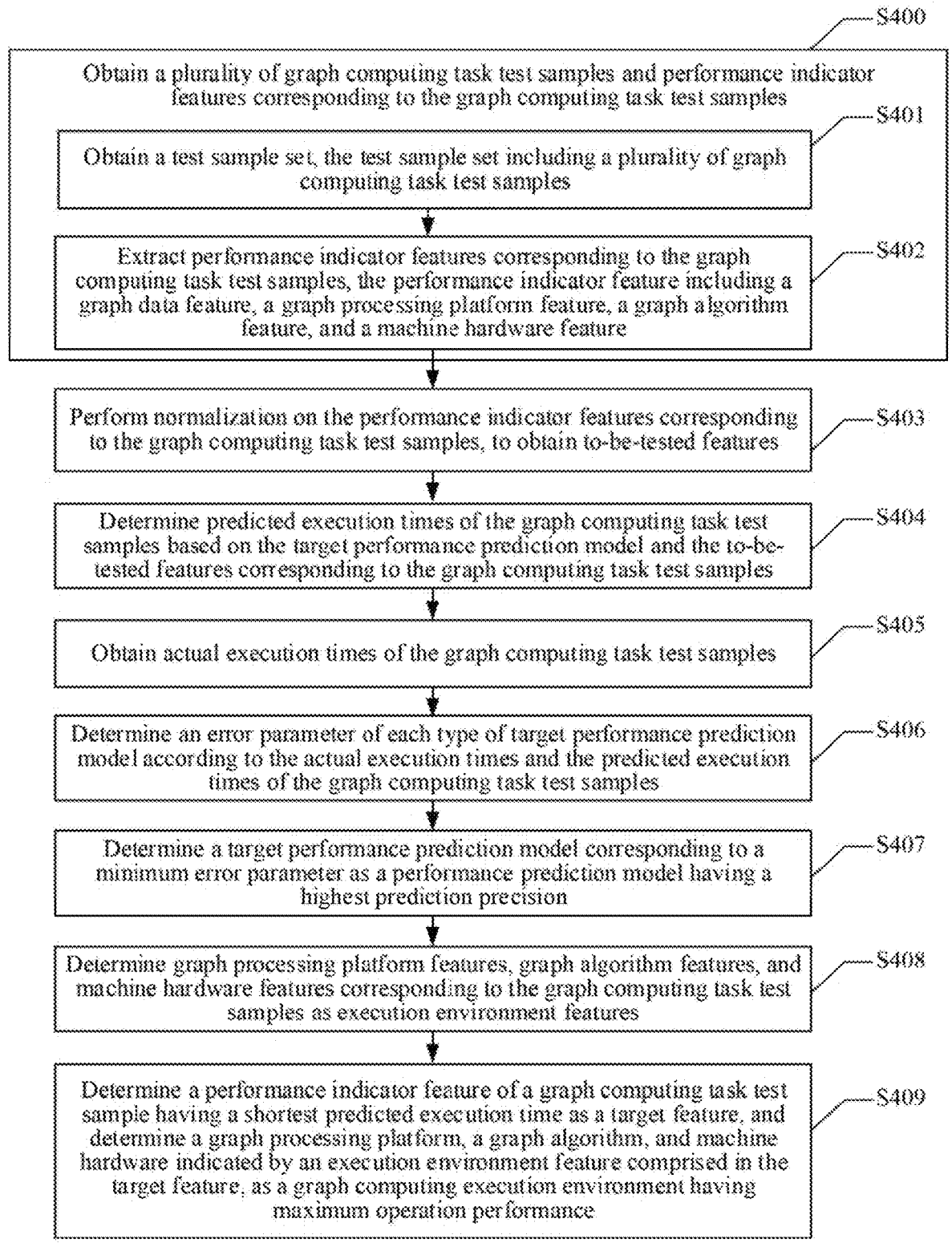
FIG. 6 is a schematic flowchart of a model application method according to an embodiment of this disclosure.

FIG. 6 is a schematic flowchart of a model application method according to an embodiment of this disclosure. The method is applicable to the server 100 shown in FIG. 1 or the server b2 shown in FIG. 2. As shown in FIG. 6, the method may include the following steps.

In step S400, a plurality of graph computing task test samples and performance indicator features corresponding to the graph computing task test samples are obtained. This step for example includes step S401 and step S402, which are as follows.

In step S401, a test sample set is obtained. The test sample set includes a plurality of graph computing task test samples.

For example, the graph computing task test samples are obtained in a plurality of graph processing platforms of different types, and all the obtained graph computing task test samples are referred to as the test sample set. All the obtained graph computing task test samples have a plurality of types of performance indicator features such as a graph data feature, a graph processing platform feature, a graph algorithm feature, and a machine hardware feature, and at least one type of feature in a graph data feature, a graph processing platform feature, a graph algorithm feature, and a machine hardware feature of one graph computing task test sample is different from that of another different graph computing task test sample. The obtained graph computing task test samples correspond to a plurality of different graph data features, graph processing platform features, graph algorithm features, and machine hardware features. The graph computing task test samples having rich feature types are used as a test sample set, so that when the trained target performance prediction model predicts execution times of the graph computing task test samples, more accurate testing and analyzing may be performed.

In step S402, performance indicator features corresponding to the graph computing task test samples are extracted. The performance indicator feature includes a graph data feature, a graph processing platform feature, a graph algorithm feature, and a machine hardware feature.

For an exemplary implementation method, reference may be made to the description of step S202 to step S205 in the embodiment corresponding to FIG. 4, and details are not described herein again.

In step S403, normalization is performed on the performance indicator features corresponding to the graph computing task test samples, to obtain to-be-tested features.

For example, normalization is performed on the extracted performance indicator features corresponding to the graph computing task test samples, and a normalized performance indicator feature of each graph computing task test sample is referred to as a to-be-tested feature of each graph computing task test sample. The to-be-tested feature of each graph computing task test sample includes performance indicator features of a graph data feature, a graph processing platform feature, a graph algorithm feature, and a machine hardware feature, and each graph computing task test sample has different performance indicator features.

In step S404, predicted execution times of the graph computing task test samples are determined based on the target performance prediction model and the to-be-tested features corresponding to the graph computing task test samples.

For example, the extracted to-be-tested feature corresponding to each graph computing task test sample is inputted to the trained target performance prediction model, the to-be-tested feature corresponding to each graph computing task test sample is converted into a model parameter based on a model feature parameter of the target performance prediction model, and the target performance prediction model correspondingly outputs a predicted execution time of each graph computing task test sample according to the obtained model parameter corresponding to each graph computing task test sample. That is, that an execution times of a graph computing task test sample is predicted based on the target performance prediction model is implemented, and the graph computing task test sample does not need to be performed. According to an obtained predicted execution time corresponding to each graph computing task test sample, the performance of the graph computing task test sample may be further analyzed.

In step S405, actual execution times of the graph computing task test samples are obtained.

Specifically, an actual execution time of each graph computing task test sample is obtained on a graph processing platform in which the graph computing task test samples are executed, that is, a time actually taken by executing each graph computing task test sample on the graph processing platform is obtained, for example, 8 hours, one day, a month, or the like.

In step S406, an error parameter of each type of target performance prediction model is determined according to the actual execution times and the predicted execution times of the graph computing task test samples.

For example, an error parameter of each type of target performance prediction model is determined according to the actual execution times and the predicted execution times of the graph computing task test samples, that is, time differences between two types of execution times are obtained according to the actual execution times and the predicted execution times, that are obtained according to the target performance prediction model, of the graph computing task test samples.

An error parameter of the target performance prediction model is obtained according to the time differences corresponding to the graph computing task test samples, and the accuracy of the target performance prediction model is measured by using the error parameter. A smaller error parameter indicates that the accuracy corresponding to the target performance prediction model is higher. Conversely, a greater error parameter indicates that the accuracy corresponding to the target performance prediction model is lower.

Herein, the error parameter may be represented by using a mean absolute percentage error (MAPE).

$$MAPE = \frac{1}{n}\sum_{t=1}^{n}\left|\frac{\text{estimate} - \text{real}_t}{\text{real}_t}\right|.$$

where n is a quantity of the graph computing task test samples, estimate is a predicted execution time obtained by using the target performance prediction model, and $\text{real}_t$ is an actual execution time corresponding to a $t^{th}$ graph computing task test sample.

The initial training model may be any model of KNN (a model of an IBk trainer based on K nearest neighbor), Decision Tree (a model of M5P (a classifier) based on a decision tree), Decision Tree (a model of REPTree (a classifier) based on a decision tree), GBDT (a model of a bagging trainer and an additive regression trainer based on a gradient boosting tree), SVM (a model of a random forest algorithm trainer and an SMOreg (an algorithm) trainer based on a support vector machine), an MLP model, a CNN, an RNN, and an LSTM network A target performance prediction model corresponding to each type of initial performance prediction model may be obtained by training each type of initial performance prediction model by using the graph computing task training samples. That is, the target performance prediction model also includes any model of KNN (a model of an IBk trainer based on K nearest neighbor), Decision Tree (a model of M5P (a classifier) based on a decision tree), Decision Tree (a model of REPTree (a classifier) based on a decision tree), GBDT (a model of a bagging trainer and an additive regression trainer based on a gradient boosting tree), SVM (a model of a random forest algorithm trainer and an SMOreg (an algorithm) trainer based on a support vector machine), a multilayer perceptron (MLP) model invoking Tensorflow, a CNN, an RNN, and an LSTM network, to obtain the error parameter corresponding to each type of target performance prediction model.

In step S407, a target performance prediction model corresponding to a minimum error parameter is determined as a performance prediction model having a highest prediction precision.

For example, a target performance prediction model corresponding to a minimum error parameter is determined as a performance prediction model having a highest prediction precision by computing an error parameter for each type of target performance prediction model.

For example, an error parameter of a target performance prediction model of a Linear Regression type is 88.99%, an error parameter of a target performance prediction model of a KNN type is 9.15%, an error parameter of a target performance prediction model of a Decision Tree type with a trainer being m5p is 35.6%, an error parameter of a target performance prediction model of a Decision Tree type with a trainer being REPTree is 33.43%, an error parameter of a target performance prediction model of a bagging (a model based on a bagging trainer) type is 34.02%, an error parameter of a target performance prediction model of a GBDT type is 49.53%, an error parameter of a target performance prediction model of a random forest type is 26.24%, an error parameter of a target performance prediction model of an SVM type is 75.16%, an error parameter of a target performance prediction model of an MLP type is 14.54%, an error parameter of a target performance prediction model of a CNN type is 43.63%, an error parameter of a target performance prediction model of an RNN type is 37.25%, and an error parameter of a target performance prediction model of an LSTM type is 61.92%.

Therefore, by comparing the target performance prediction models of various types, it is found that the error parameter 9.15% of the target performance prediction model of the KNN type is the minimum value, and the error parameter 14.54% of the target performance prediction model of the MLP type is the second minimum value. That is, through actual applications, the target performance prediction model of the KNN type may be used as an optimal performance prediction model, and the target performance prediction model of the MLP type may be used as a second optimal performance prediction model.

KNN learns by analogy, that is, learns by comparing given checking tuples with training tuples similar to the checking tuples. For k-nearest neighbor classification, an unknown tuple is designated to a majority class in k nearest neighbors of the tuple. KNN may also be used in value prediction, and a classifier returns an average of labels of real numbers of the k nearest neighbors of the unknown tuple. The attribute of KNN is coincident with performance modeling of the graph computing, that is, performance of similar graph computing tasks is similar. In KNN, the similarity between graph computing tasks may be reflected to a space of feature extraction of graph computing tasks, that is, reflects that a distance between feature vectors of similar graph computing tasks is close.

A prediction error of MLP in a test set is 14.54%. In actual applications, in MLP, a fully connected network including 3 hidden layers is built, each layer having 128 neurons, and a loss function is an MAPE, that is, an error parameter. Forward propagation is to gradually transfer information from the first layer to a next layer, and then a loss is propagated from a next layer to a previous layer by using a back propagation (BP) algorithm, to perform parameter estimation, thereby completing update of a parameter, to obtain a more accurate model.

Compared with another type of target performance prediction model having a relatively large error parameter, because the model is not applicable to the performance indicator feature by selecting a depict graph to compute the performance in this embodiment of this disclosure, a predicted execution time of the graph computing task is inaccurate.

The obtained error parameters of the target performance prediction models are obtained based on a plurality of graph algorithms, and the target performance prediction models of various types may be alternatively tested by using graph computing task test samples with the same graph algorithm feature. That is, the graph computing task test samples are classified according to the graph algorithm feature, to obtain a graph computing task test sample corresponding to a graph algorithm PR, a graph computing task test sample corresponding to a graph algorithm SSSP, a graph computing task test sample corresponding to a graph algorithm BFS, a graph computing task test sample corresponding to a graph algorithm WCC, a graph computing task test sample corresponding to a graph algorithm CDLP, and a graph computing task test sample corresponding to a graph algorithm LCC.

The target performance prediction models are respectively tested by using each type of graph computing task test sample after the classification, to obtain error parameters of target performance prediction models in the same type of graph algorithm, that is, to respectively obtain error parameters of the target performance prediction models corresponding to each type of graph algorithm, so that each type of graph algorithm is analyzed based on the error parameters of the target performance prediction models corresponding to the each type of graph algorithm.

Figure 7:
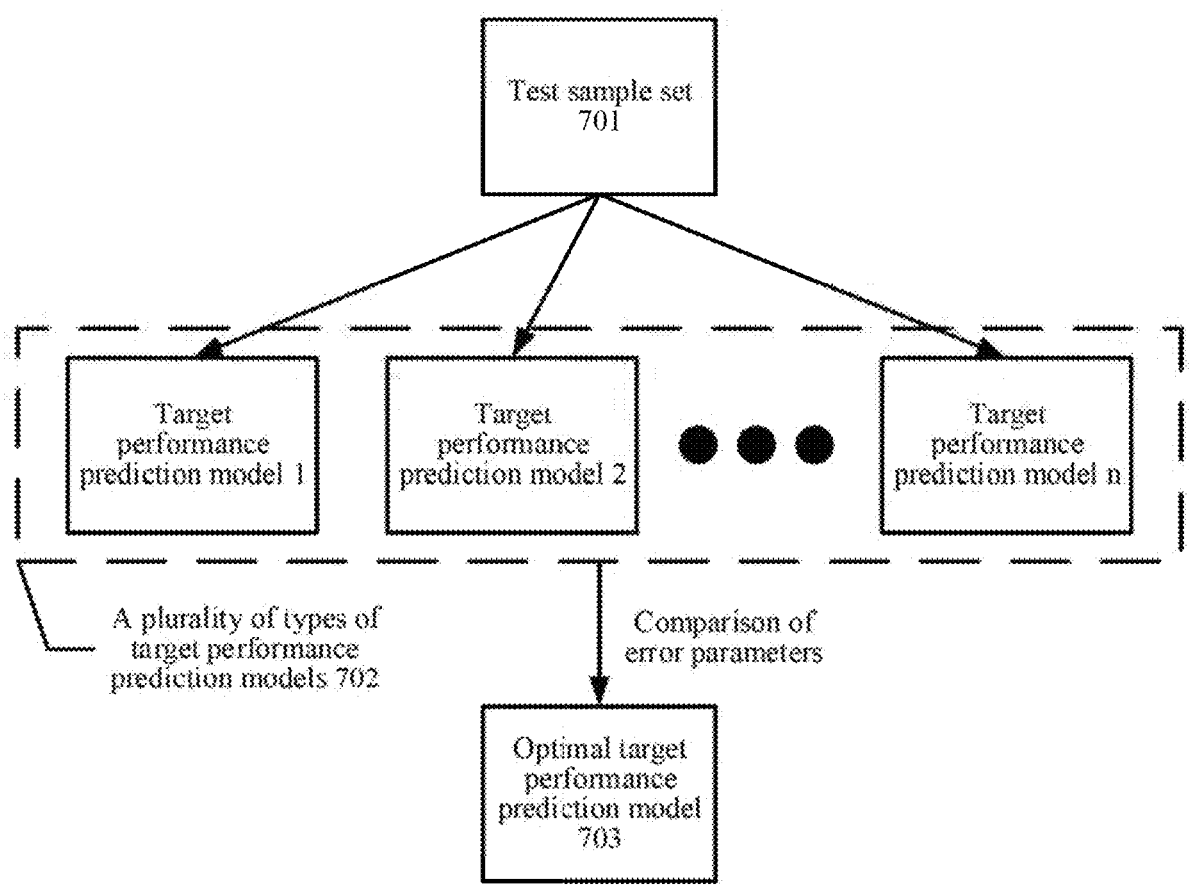
FIG. 7 is a schematic diagram of a scenario of obtaining an optimal target performance prediction model according to an embodiment of this disclosure.

FIG. 7 is a schematic diagram of a scenario of obtaining an optimal target performance prediction model according to an embodiment of this disclosure. As shown in FIG. 7, a test sample set 701 is respectively inputted to each of a plurality of types of target performance prediction models 702. n types of target performance prediction models provided herein are respectively a target performance prediction model 1 to a target performance prediction model n, and error parameters of the plurality of types of target performance prediction models are obtained. By comparing the error parameters of the plurality of types of target performance prediction models, a target performance prediction model having a minimum error parameter is referred to as an optimal target performance prediction model 703, that is, a performance prediction model having a highest prediction precision.

In step S408, graph processing platform features, graph algorithm features, and machine hardware features corresponding to the graph computing task test samples are determined as execution environment features.

For example, graph processing platform features, graph algorithm features, and machine hardware features corresponding to the graph computing task test samples are referred to as execution environment features, that is, an execution environment of a graph computing task test sample includes a graph processing platform, a graph algorithm, and machine hardware.

In step S409, a performance indicator feature of a graph computing task test sample having a shortest predicted execution time as a target feature is determined, and a graph processing platform, a graph algorithm, and machine hardware indicated by an execution environment feature included in the target feature, is determined as a graph computing execution environment having maximum operation performance.

For example, herein, graph data features of graph computing task test samples used for testing the target performance prediction model are the same. That is, graph data is given, and an optimal execution environment of the given graph data is determined, which may improve the execution efficiency of graph computing. That is, herein graph data features corresponding to the graph computing task test samples are the same, but at least one of graph processing platform features, graph algorithm features, and machine hardware features are different. By comparing predicted execution times of the graph computing task test samples obtained based on the target performance prediction model, a performance indicator feature of a graph computing task test sample having a shortest predicted execution time is determined as a target feature. The target feature includes the execution environment features, that is, includes a graph processing platform feature, a graph algorithm feature, and a machine hardware feature. A graph processing platform, a graph algorithm, and machine hardware of the graph computing task test sample corresponding to the target feature are referred to as the optimal execution environment of the given graph data, that is, a graph computing execution environment having maximum operation performance.

For example, an optimal execution environment of a graph computing task corresponding to given graph data may be determined by using the model having the highest precision selected in step S405 to step S407, to obtain a better optimal execution environment corresponding to the given graph data.

Figure 8:
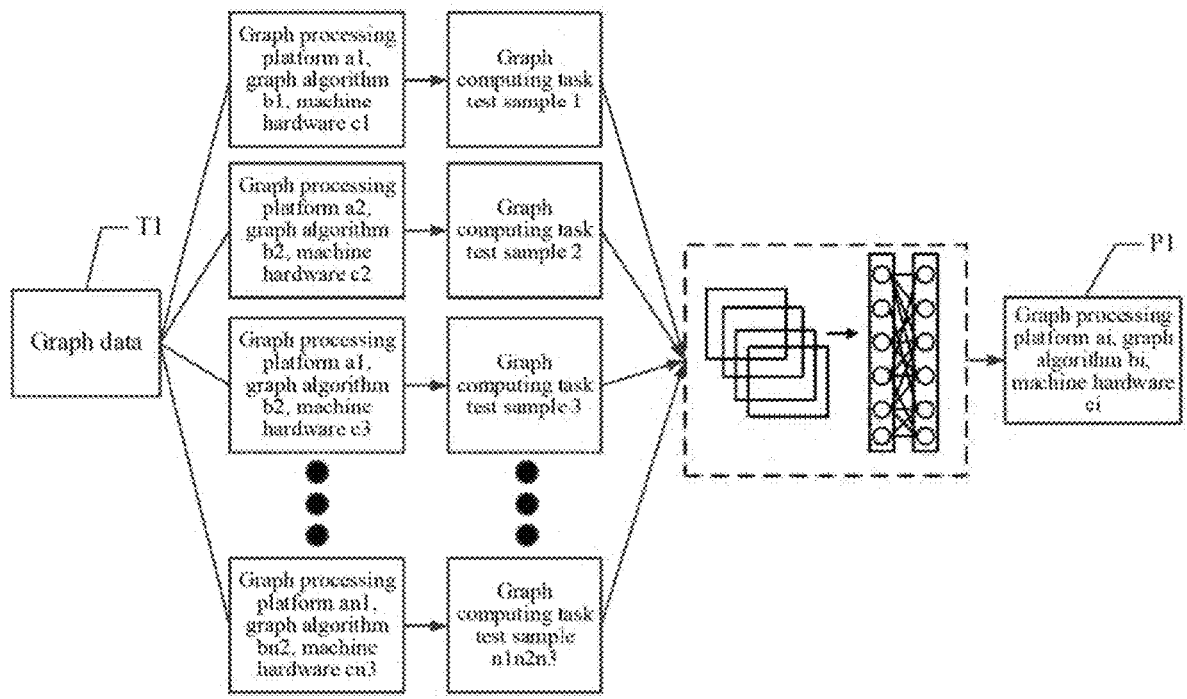
FIG. 8 is a schematic diagram of a scenario of obtaining an optimal execution environment according to an embodiment of this disclosure.

FIG. 8 is a schematic diagram of a scenario of obtaining an optimal execution environment according to an embodiment of this disclosure. As shown in FIG. 8, graph data of all graph computing task test samples in a test sample set T1 is given, that is, performance indicator features corresponding to graph data features of all the graph computing task test samples in the set T1 are determined and are the same. The given graph data is combined with a graph processing platform a1, a graph algorithm b1, and machine hardware c1, to generate a graph computing task test sample 1, the given graph data is combined with a graph processing platform a2, a graph algorithm b2, and machine hardware c2, to generate a graph computing task test sample 2, and the given graph data is combined with a graph processing platform a1, a graph algorithm b2, and machine hardware c3, to generate a graph computing task test sample 3. There are n1 types of graph processing platforms, n2 types of graph algorithms, and n3 types of machine hardware, so that there are n1*n2*n3 types of combinations in total, that is, n1*n2*n3 graph computing task test samples may be generated. The given graph data is combined with a graph processing platform an1, a graph algorithm bn2, and machine hardware cn3, to generate a graph computing task test sample n1*n2*n3.

All samples or partial samples in the n1*n2*n3 graph computing task test samples are used as inputs of the target performance prediction model, to obtain predicted execution times respectively corresponding to the inputted graph computing task test samples. A graph computing task test sample having a shortest predicted execution time is referred to as a sample P, and an execution environment formed by a graph processing platform ai, a graph algorithm bi, and machine hardware ci included in the sample P is referred to as the optimal execution environment of the given graph data, that is, an execution environment that is of the given graph data and has the best operation performance.

Figure 9:
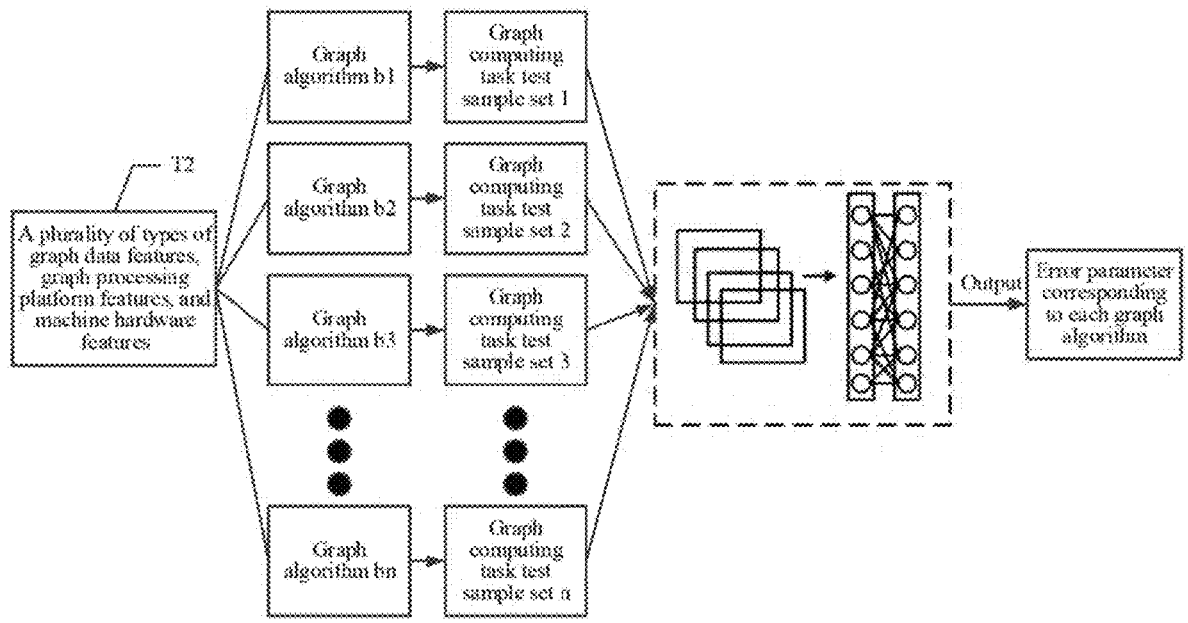
FIG. 9 is a schematic diagram of a scenario of obtaining an error parameter of a graph algorithm according to an embodiment of this disclosure.

FIG. 9 is a schematic diagram of a scenario of obtaining an error parameter of a graph algorithm according to an embodiment of this disclosure. As shown in FIG. 9, a set T2 is a feature set of graph computing task test samples, and the feature set includes a plurality of types of graph data features, graph processing platform features, and machine hardware features. The graph data features, the graph processing platform features, and the machine hardware features in the feature set are randomly combined. That is, one feature combination includes one type of graph data feature, one type of graph processing platform feature, and one type of machine hardware feature, and at least one of graph data features, graph processing platform features, and machine hardware features included in any two combinations are different. For example, the feature set includes n1 graph data features, n2 graph processing platform features, and n3 machine hardware features, so that there are n1*n2*n3 types of feature combinations in total.

A feature of a graph algorithm b1 is added to each obtained feature combination, to generate a graph computing task test sample set 1, where each sample in the set includes the feature of the graph algorithm b1. A feature of a graph algorithm b2 is added to each obtained feature combination, to generate a graph computing task test sample set 2, where each sample in the set includes the feature of the graph algorithm b2. A feature of a graph algorithm b3 is added to each obtained feature combination, to generate a graph computing task test sample set 3, where each sample in the set includes the feature of the graph algorithm b3. There may be n types of graph algorithms, and a feature of a graph algorithm bn is added to each obtained feature combination, to generate a graph computing task test sample set n, where each sample in the set includes the feature of the graph algorithm bn.

The graph computing task test sample set 1 to the graph computing task test sample set n are respectively inputted to the target performance prediction model, to obtain a predicted execution time of each graph computing task test sample in each graph computing task test sample set. Error parameters, of the target performance prediction model, corresponding to each graph computing task test sample set are obtained according to predicted execution times and actual execution times of graph computing task test samples in the each graph computing task test sample set. The error parameters are used as error parameters corresponding to different graph algorithms included in each graph computing task test sample set, that is, one type of graph algorithm corresponds to one error parameter, to test different prediction errors of the target performance prediction model specific to different graph algorithms. The error parameter is a comprehensive error specific to each type of graph algorithm, that is, a comprehensively measured error of each graph algorithm in a plurality of types of graph data features, graph processing platform features, and machine hardware features.

Further, the initial performance prediction model may be trained by using a mapping relationship between the performance indicator features and actual execution times corresponding to the graph computing task test samples classified according to a graph algorithm category, to obtain a target performance prediction model corresponding to each type of graph algorithm, that is, one type of graph algorithm corresponds to one target performance prediction model, and an error parameter of the target performance prediction model corresponding to each type of graph algorithm is obtained through computation and is used as an error parameter corresponding to the each type of graph algorithm.

Figure 10:
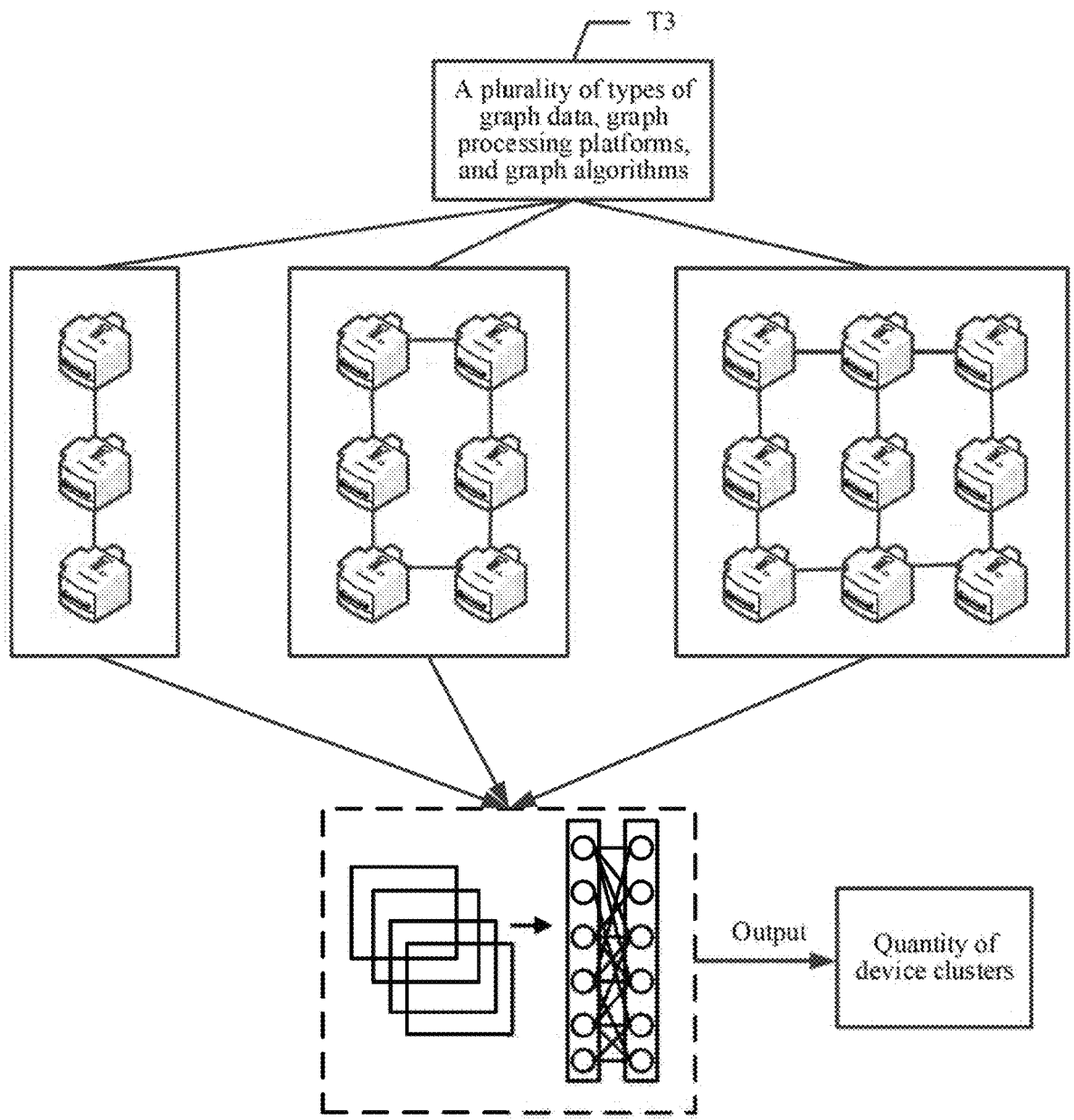
FIG. 10 is a schematic diagram of a scenario of obtaining an optimal quantity of clusters according to an embodiment of this disclosure.

FIG. 10 is a schematic diagram of a scenario of obtaining an optimal quantity of clusters according to an embodiment of this disclosure. As shown in FIG. 10, a set T3 is a feature set of graph computing task test samples, and the feature set includes a plurality of types of graph data features, graph processing platform features, and graph algorithm features. The graph data features, the graph processing platform features, and the graph algorithm features in the feature set are randomly combined. That is, one feature combination includes one type of graph data feature, one type of graph processing platform feature, and one type of graph algorithm feature, and at least one of graph data features, graph processing platform features, and graph algorithm features included in any two combinations are different. For example, the feature set includes n1 graph data features, n2 graph processing platform features, and n3 Graph algorithm features, so that there are n1*n2*n3 types of feature combinations in total.

A machine hardware feature with a quantity of device clusters being 3 is added to each obtained feature combination, to generate a graph computing task test sample set, where each sample in the set includes the machine hardware feature with a quantity of device clusters being 3. A machine hardware feature with a quantity of device clusters being 6 is added to each obtained feature combination, to generate a graph computing task test sample set, where each sample in the set includes the machine hardware feature with a quantity of device clusters being 6. A machine hardware feature with a quantity of device clusters being 9 is added to each obtained feature combination, to generate a graph computing task test sample set, where each sample in the set includes the machine hardware feature with a quantity of device clusters being 9. An example in which the quantity of device clusters are 3, 6, and 9 is used herein, and a specific quantity of device clusters is determined according to actual application scenarios. This is not limited herein.

The graph computing task test sample sets including different machine hardware features are respectively inputted to the target performance prediction model, to obtain a predicted execution time of each graph computing task test sample in each graph computing task test sample set. Predicted execution times of each graph computing task test sample obtained under configuration of different quantities of device clusters are compared, and a quantity of clusters corresponding to a graph computing task test sample set having a shortest predicted execution time is used as an optimal quantity of device clusters, that is, the operation performance of a graph computing task is the best under the condition of the machine hardware feature corresponding to the optimal quantity of device clusters.

Further, any one, two, or three features in the graph data feature, the graph processing platform feature, the graph algorithm feature, and the machine hardware feature may be fixed to obtain optimal configuration corresponding to another feature that is not fixed by predicting an execution time. For example, the graph data feature, the graph algorithm feature, and the machine hardware feature are fixed, under configuration of graph processing platform features corresponding to a plurality of types of graph processing platforms, predicted execution times of graph computing tasks under configuration of each type of graph processing platform feature are obtained based on the target performance prediction model, and a graph processing platform directed by a graph processing platform feature corresponding to a graph computing task test sample having a shortest predicted execution time is used as an optimal graph processing platform.

In another example, the graph processing platform feature, the graph algorithm feature, and the machine hardware feature are fixed, predicted execution times of graph computing tasks under configuration of graph data features corresponding to a plurality of different types of graph data are obtained based on the target performance prediction model, and graph data corresponding to a graph data feature having a shortest predicted execution time is used as graph data having the highest execution efficiency in a given execution environment.

Figure 11:
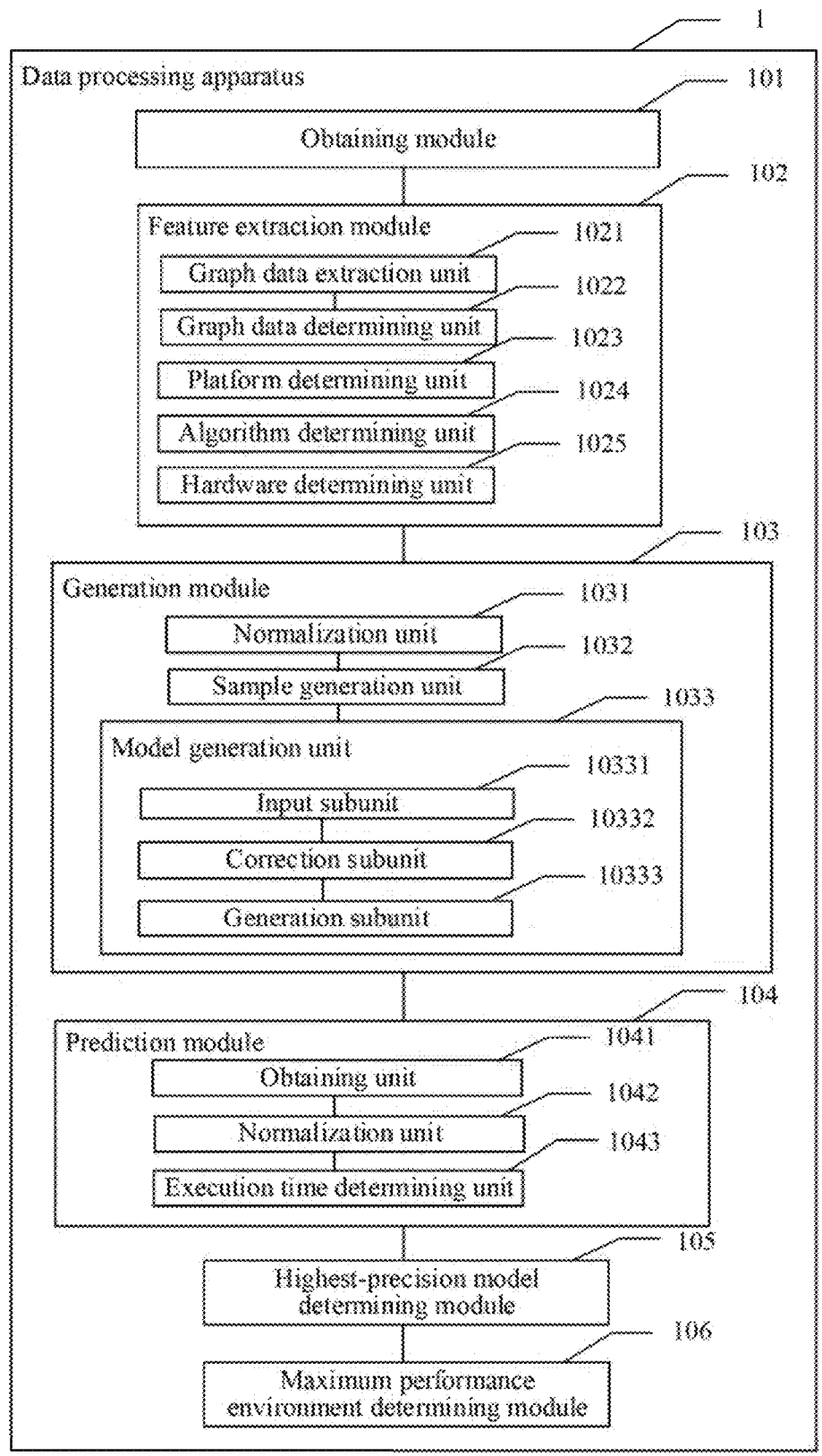
FIG. 11 is a schematic structural diagram of a data processing apparatus according to an embodiment of this disclosure.

FIG. 11 is a schematic structural diagram of a data processing apparatus according to an embodiment of this disclosure. As shown in FIG. 11, the data processing apparatus 1 may include: an obtaining module 101, a feature extraction module 102, a generation module 103, and a prediction module 104. One or more of modules and/or units of the apparatus can be implemented by processing circuitry, software, or a combination thereof, for example.

The obtaining module 101 is configured to obtain a training sample set, the training sample set including a plurality of graph computing task training samples.

The feature extraction module 102 is configured to extract performance indicator features corresponding to the graph computing task training samples, the performance indicator feature including at least one of the following: a graph data feature, a graph processing platform feature, a graph algorithm feature, and a machine hardware feature.

The generation module 103 is configured to generate a target performance prediction model based on a mapping relationship between actual execution times of the graph computing task training samples and the corresponding performance indicator features.

The prediction module 104 is configured to output, according to a performance indicator feature corresponding to an inputted graph computing task test sample, a predicted execution time of the graph computing task test sample by using the target performance prediction model.

For an exemplary implementation process of the obtaining module 101, the feature extraction module 102, the generation module 103, and the prediction module 104, reference may be made to the description of step S101 to step S104 in the embodiment corresponding to FIG. 3, and details are not described herein again.

When the performance indicator feature is the graph data feature, the feature extraction module 102 includes a graph data extraction unit 1021 and a graph data determining unit 1022.

The graph data extraction unit 1021 is configured to extract a degree of each vertex in graph data corresponding to each graph computing task training sample.

The graph data determining unit 1022 is configured to determine a degree distribution of the each graph computing task training sample according to a degree interval of the each graph computing task training sample and the degree of each vertex.

For an exemplary implementation process of the graph data extraction unit 1021 and the graph data determining unit 1022, reference may be made to the description of step S202 in the embodiment corresponding to FIG. 4, and details are not described herein again.

When the performance indicator feature is the graph processing platform feature, the feature extraction module 102 includes a platform determining unit 1023.

The platform determining unit 1023 is configured to determine at least one of a graph division rule, a memory pool capacity, a communication buffer capacity, a message dispatch policy, a quantity of supersteps, and a quantity of messages of a graph processing platform corresponding to each graph computing task training sample as the graph processing platform feature.

For an exemplary implementation process of the platform determining unit 1023, reference may be made to the description of step S203 in the embodiment corresponding to FIG. 4, and details are not described herein again.

When the performance indicator feature is the graph algorithm feature, the feature extraction module 102 includes an algorithm determining unit 1024.

The algorithm determining unit 1024 is configured to determine at least one of a computation amount, a quantity of supersteps, a data volume of a single message, and a total quantity of messages of a graph algorithm corresponding to each graph computing task training sample as the graph algorithm feature.

For an exemplary implementation process of the algorithm determining unit 1024, reference may be made to the description of step S204 in the embodiment corresponding to FIG. 4, and details are not described herein again.

When the performance indicator feature is the machine hardware feature, the feature extraction module 102 includes a hardware determining unit 1025.

The hardware determining unit 1025 is configured to determine at least one of core processing performance, a memory capacity, network bandwidth, and a quantity of device clusters of machine hardware corresponding to each graph computing task training sample as the machine hardware feature.

For an exemplary implementation process of the hardware determining unit 1025, reference may be made to the description of step S205 in the embodiment corresponding to FIG. 4, and details are not described herein again.

The generation module 103 includes a normalization unit 1031, a sample generation unit 1032, and a model generation unit 1033.

The normalization unit 1031 is configured to perform normalization on the performance indicator features corresponding to the graph computing task training samples, to obtain to-be-trained features.

The sample generation unit 1032 is configured to generate a target training sample set based on a mapping relationship between the actual execution times of the graph computing task training samples and the corresponding to-be-trained features.

The model generation unit 1033 is configured to train an initial performance prediction model based on the target training sample set and the mapping relationship, to obtain the target performance prediction model.

The model generation unit 1033 includes an input subunit 10331, a correction subunit 10332, and a generation subunit 10333.

The input subunit 10331 is configured to input the target training sample set to an input layer of the initial performance prediction model, and obtain predicted training times of the graph computing task training samples at an output layer of the initial performance prediction model.

The correction subunit 10332 is configured to correct a model parameter of the initial performance prediction model based on the actual execution times and the predicted training times of the graph computing task training samples.

The generation subunit 10333 is configured to generate the target performance prediction model based on the initial performance prediction model, the corrected model parameter, and the mapping relationship.

For an exemplary implementation process of the normalization unit 1031, the sample generation unit 1032, the model generation unit 1033, and subunits thereof, reference may be made to the description of step S303 to step S305 in the embodiment corresponding to FIG. 5a, and details are not described herein again.

The prediction module 104 includes an obtaining unit 1041, a normalization unit 1042, and an execution time determining unit 1043.

The obtaining unit 1041 is configured to obtain a plurality of graph computing task test samples and performance indicator features corresponding to the graph computing task test samples.

The normalization unit 1042 is configured to perform normalization on the performance indicator features corresponding to the graph computing task test samples, to obtain to-be-tested features.

The execution time determining unit 1043 is configured to determine predicted execution times of the graph computing task test samples based on the target performance prediction model and the to-be-tested features corresponding to the graph computing task test samples.

For an exemplary implementation process of the foregoing subunits, reference may be made to the description of step S400 to step S404 in the embodiment corresponding to FIG. 6, and details are not described herein again.

The initial performance prediction model includes a plurality of types of performance prediction models, each type of initial performance prediction model corresponding to one type of target performance prediction model. The apparatus 1 further includes a highest-precision model determining module 105, configured to obtain actual execution times of the graph computing task test samples; determine an error parameter of each type of target performance prediction model according to the actual execution times and the predicted execution times of the graph computing task test samples; and determine a target performance prediction model corresponding to a minimum error parameter as a performance prediction model having a highest prediction precision.

For an exemplary implementation process of the highest-precision model determining module 105, reference may be made to the description of step S405 to step S407 in the embodiment corresponding to FIG. 6, and details are not described herein again.

Graph data features corresponding to the graph computing task test samples are the same. The apparatus 1 further includes a maximum performance environment determining module 106, configured to determine graph processing platform features, graph algorithm features, and machine hardware features corresponding to the graph computing task test samples as execution environment features; and determine a performance indicator feature of a graph computing task test sample having a shortest predicted execution time as a target feature, and determine a graph processing platform, a graph algorithm, and machine hardware indicated by an execution environment feature included in the target feature, as a graph computing execution environment having maximum operation performance.

For an exemplary implementation process of the maximum performance environment determining module 106, reference may be made to the description of step S408 to step S409 in the embodiment corresponding to FIG. 6, and details are not described herein again.

Figure 12:
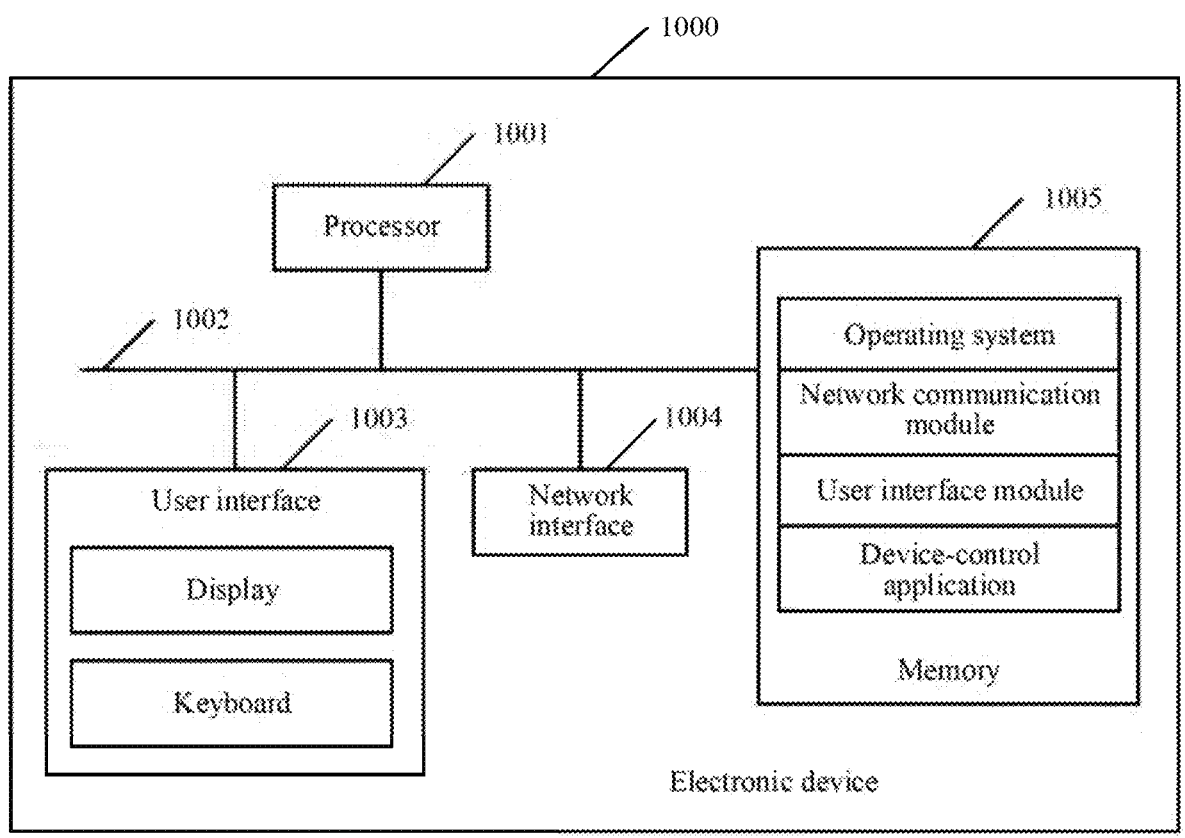
FIG. 12 is a schematic structural diagram of an electronic device according to an embodiment of this disclosure.

FIG. 12 is a schematic structural diagram of an electronic device according to an embodiment of this disclosure. As shown in FIG. 12, the electronic device 1000 may include: a processor 1001, a network interface 1004, and a memory 1005, as well as a user interface 1003 and at least one communication bus 1002. The communication bus 1002 is configured to implement connection and communication between the components. The user interface 1003 may include a display and a keyboard. The user interface 1003 may further include a standard wired interface and a wireless interface. The network interface 1004 may include a standard wired interface and a standard wireless interface (e.g., a Wi-Fi interface). The memory 1005 may be a high-speed RAM memory, or may be a non-volatile memory, for example, at least one magnetic disk memory. The memory 1005 may be further at least one storage apparatus away from the processor 1001. As shown in FIG. 12, the memory 1005 used as a computer storage medium may include an operating system, a network communication module, a user interface module, and a device-control application.

In the electronic device 1000 shown in FIG. 12, the network interface 1004 may provide a network communication function, the user interface 1003 is mainly configured to provide an input interface for a user, and the processor 1001 is an example of processing circuitry and may be configured to invoke the device-control application stored in the memory 1005, to implement the description of the data processing method in the embodiment corresponding to any one of FIG. 3, FIG. 4, FIG. 5a, FIG. 5b, and FIG. 6. The electronic device 10K) has the same beneficial effects as the data processing apparatus 1.

Figure 5B:
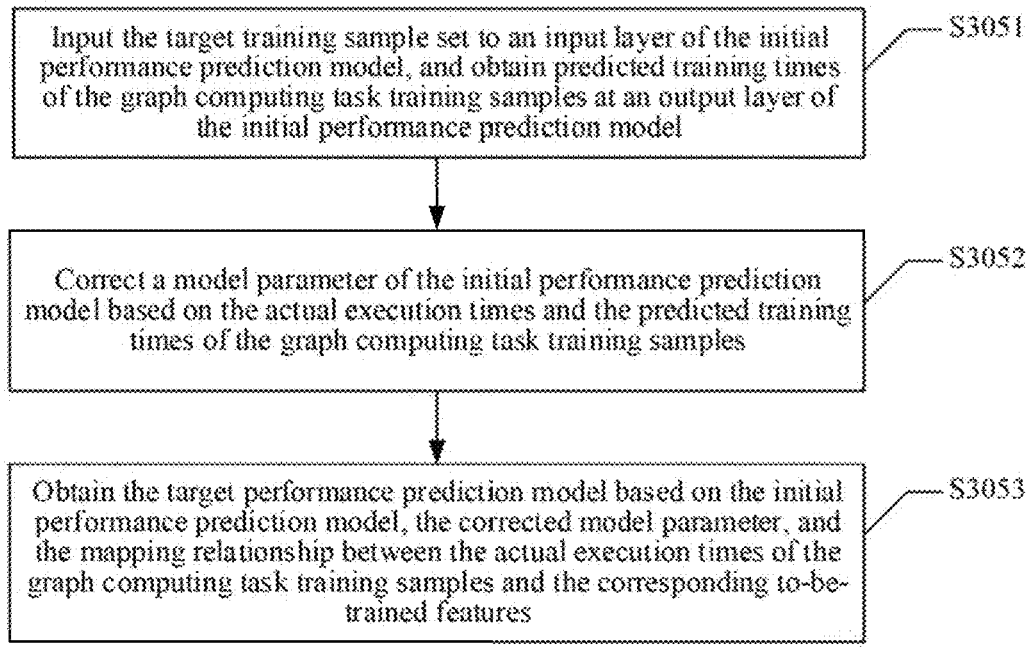
FIG. 5b is a schematic flowchart of generating a target performance prediction model according to an embodiment of this disclosure.

It is to be understood that, the electronic device 100) described in this embodiment of this disclosure can implement the description of the data processing method in the embodiment corresponding to any one of FIG. 3, FIG. 4. FIG. 5a, FIG. 5b, and FIG. 6, and can also implement the description of the data processing apparatus 1 in the embodiment corresponding to FIG. 11. Details are not described herein again. In addition, the description of beneficial effects of using the same method are not described herein again.

In addition, an embodiment of this disclosure further provides a computer storage medium, such as a non-transitory computer-readable storage medium. The computer storage medium stores a computer program executed by the data processing apparatus 1 mentioned above, and the computer program includes program instructions. When executing the program instructions, the processor can perform the description of the data processing method in the embodiment corresponding to any one of FIG. 3, FIG. 4, FIG. 5a, FIG. 5b, and FIG. 6. Therefore, details are not described herein again. In addition, the description of beneficial effects of using the same method are not described herein again. For technical details that are not disclosed in the computer storage medium embodiments of this disclosure, refer to the descriptions of the method embodiments of this disclosure.

A person of ordinary skill in the art may understand that all or some of the procedures of the methods of the foregoing embodiments may be implemented by a computer program instructing relevant hardware. The program may be stored in a computer-readable storage medium. When the program is executed, the procedures of the foregoing method embodiments may be implemented. The foregoing storage medium may include a magnetic disc, an optical disc, a read-only memory (ROM), a random access memory (RAM), or the like.

What is disclosed above is merely exemplary embodiments of this disclosure, and is not intended to limit the scope of the claims of this disclosure. Therefore, equivalent variations made in accordance with the claims of this disclosure shall fall within the scope of this disclosure.

What is claimed is:

1. A data processing method comprising:
   obtaining a training sample set that includes a plurality of graph computing task training samples in which data is represented as vertices and associations between the vertices are represented as edges in graph data;
   extracting at least one performance indicator feature of each of the graph computing task training samples, the at least one performance indicator feature including one or more of a graph data feature, a graph processing platform feature, a graph algorithm feature, and a machine hardware feature;
   generating a target training sample set based on a mapping relationship between actual execution times of the graph computing task training samples and the performance indicator features;
   training an initial performance prediction model based on the target training sample set and the mapping relationship to obtain a target performance prediction model; and
   outputting, by processing circuitry according to at least one performance indicator feature of an inputted graph computing task test sample, a predicted execution time of the graph computing task test sample based on the target performance prediction model.

2. The method according to claim 1, wherein when the at least one performance indicator feature includes the graph data feature, the extracting comprises:
   extracting a degree of each vertex in the graph data of one of the graph computing task training samples; and
   determining a degree distribution of the one of the graph computing task training samples according to a degree interval of the one of the graph computing task training samples and the degree of each vertex in the graph data of the one of the graph computing task training samples.

3. The method according to claim 2, wherein the determining comprises:
   dividing the degree interval into a plurality of subintervals;
   determining a quantity of the vertices comprised in each of the subintervals according to a degree range of a subinterval of the subintervals to which the degree of each vertex in the graph data of the one of the graph computing task training samples belongs; and
   determining the degree distribution of the one of the graph computing task training samples according to the quantity of the vertices included in each of the subintervals.

4. The method according to claim 1, wherein when the at least one performance indicator feature includes the graph processing platform feature, the extracting comprises:
   determining the graph processing platform feature based on at least one of a graph division rule, a memory pool capacity, a communication buffer capacity, a message dispatch policy, a quantity of supersteps, or a quantity of messages of a graph processing platform.

5. The method according to claim 1, wherein when the at least one performance indicator feature includes the graph algorithm feature, the extracting comprises:
   determining the graph algorithm feature based on at least one of a computation amount, a quantity of supersteps, a data volume of a single message, or a total quantity of messages of a graph algorithm.

6. The method according to claim 5, wherein when the graph algorithm feature is based on the total quantity of messages, the determining comprises:
   obtaining the total quantity of messages through computation according to logic of the graph algorithm, or by solving a model built for a quantity of messages.

7. The method according to claim 1, wherein when the at least one performance indicator feature includes the machine hardware feature, the extracting comprises:
   determining the machine hardware feature based on at least one of core processing performance, a memory capacity, network bandwidth, or a quantity of device clusters of machine hardware.

8. The method according to claim 1, wherein the generating comprises:
   obtaining to-be-trained features based on a normalization performed on the performance indicator features of the graph computing task training samples; and
   the generating the target training sample set includes generating the target training sample set based on 1th mapping relationship between the actual execution times of the graph computing task training samples and the to-be-trained features.

9. The method according to claim 1, wherein the training comprises:
   inputting the target training sample set to an input layer of the initial performance prediction model;
   obtaining predicted training times of the graph computing task training samples at an output layer of the initial performance prediction model;
   correcting a model parameter of the initial performance prediction model based on the actual execution times and the predicted training times of the graph computing task training samples; and
   generating the target performance prediction model based on the initial performance prediction model, the corrected model parameter, and the mapping relationship.

10. The method according to claim 1, wherein the outputting comprises:
  obtaining a plurality of graph computing task test samples and performance indicator features of the graph computing task test samples;
  obtaining to-be-tested features based on a normalization performed on the performance indicator features of the graph computing task test samples; and
  determining predicted execution times of the graph computing task test samples based on the target performance prediction model and the to-be-tested features of the graph computing task test samples.

11. The method according to claim 10, further comprising:
  obtaining actual execution times of the graph computing task test samples;
  determining an error parameter of each of a plurality of types of target performance prediction models according to the actual execution times and the predicted execution times of the graph computing task test samples; and
  determining a target performance prediction model corresponding to one of the plurality of types of target performance prediction models determined to have a minimum error parameter as a performance prediction model having a highest prediction precision.

12. The method according to claim 10, wherein the performance indicator features of the graph computing task test samples are based on a same graph data feature, and the method further comprises:
  determining execution environment feature information based on graph processing platform features, graph algorithm features, and machine hardware features of the graph computing task test samples;
  determining the at least one performance indicator feature of one of the graph computing task test samples having a shortest predicted execution time as a target feature; and
  determining a graph processing platform, a graph algorithm, and machine hardware indicated by the execution environment feature information of the target feature, as a graph computing execution environment having a maximum operation performance.

13. A data processing apparatus, comprising:
  processing circuitry configured to:
    obtain a training sample set that includes a plurality of graph computing task training samples in which data is represented as vertices and associations between the vertices are represented as edges in graph data;
    extract at least one performance indicator feature of each of the graph computing task training samples, the at least one performance indicator feature including one or more of a graph data feature, a graph processing platform feature, a graph algorithm feature, and a machine hardware feature;
    generate a target training sample set based on a mapping relationship between actual execution times of the graph computing task training samples and the performance indicator features;
    train an initial performance prediction model based on the target training sample set and the mapping relationship to obtain a target performance prediction model; and
    output, according to at least one performance indicator feature of an inputted graph computing task test sample, a predicted execution time of the graph computing task test sample based on the target performance prediction model.

14. The apparatus according to claim 13, wherein when the at least one performance indicator feature includes the graph data feature, the processing circuitry is configured to:
  extract a degree of each vertex in the graph data of one of the graph computing task training samples; and
  determine a degree distribution of the one of the graph computing task training samples according to a degree interval of the one of the graph computing task training samples and the degree of each vertex in the graph data of the one of the graph computing task training samples.

15. The apparatus according to claim 13, wherein when the at least one performance indicator feature includes the graph processing platform feature, the processing circuitry is configured to:
  determine the graph processing platform feature based on at least one of a graph division rule, a memory pool capacity, a communication buffer capacity, a message dispatch policy, a quantity of supersteps, or a quantity of messages of a graph processing platform.

16. The apparatus according to claim 13, wherein when the at least one performance indicator feature includes the graph algorithm feature, the processing circuitry is configured to:
  determine the graph algorithm feature based on at least one of a computation amount, a quantity of supersteps, a data volume of a single message, or a total quantity of messages of a graph algorithm.

17. The apparatus according to claim 13, wherein when the at least one performance indicator feature includes the machine hardware feature, the processing circuitry is configured to:
  determine the machine hardware feature based on at least one of core processing performance, a memory capacity, network bandwidth, or a quantity of device clusters of machine hardware.

18. The apparatus according to claim 13, wherein the processing circuitry is configured to:
  obtain to-be-trained features based on a normalization performed on the performance indicator features of the graph computing task training samples; and
  generate the target training sample set based on the mapping relationship between the actual execution times of the graph computing task training samples and the to-be-trained features.

19. The apparatus according to claim 13, wherein the processing circuitry is configured to:
  obtain a plurality of graph computing task test samples and performance indicator features of the graph computing task test samples;
  obtain to-be-tested features based on a normalization performed on the performance indicator features of the graph computing task test samples; and
  determine predicted execution times of the graph computing task test samples based on the target performance prediction model and the to-be-tested features of the graph computing task test samples.

20. A non-transitory computer-readable storage medium storing instructions which, when executed by a processor, cause the processor to perform:
  obtaining a training sample set that includes a plurality of graph computing task training samples in which data is represented as vertices and associations between the vertices are represented as edges in graph data;

extracting at least one performance indicator feature of each of the graph computing task training samples, the at least one performance indicator feature including one or more of a graph data feature, a graph processing platform feature, a graph algorithm feature, and a machine hardware feature;

generating a target training sample set based on a mapping relationship between actual execution times of the graph computing task training samples and the performance indicator features;

training an initial performance prediction model based on the target training sample set and the mapping relationship to obtain a target performance prediction model; and outputting, according to at least one performance indicator feature of an inputted graph computing task test sample, a predicted execution time of the graph computing task test sample based on the target performance prediction model.

\* \* \* \* \*